United States Patent [19]
Van Dijk et al.

[11] Patent Number: 5,245,110
[45] Date of Patent: Sep. 14, 1993

[54] PROCESS FOR PRODUCING AND UTILIZING AN OXYGEN ENRICHED GAS

[75] Inventors: Christiaan P. Van Dijk, Houston; Lowell D. Fraley, Sugar Land, both of Tex.

[73] Assignee: Starchem, Inc., Houston, Tex.

[21] Appl. No.: 762,505

[22] Filed: Sep. 19, 1991

[51] Int. Cl.$^5$ .............................................. C07C 1/04
[52] U.S. Cl. ................................ 585/946; 585/733; 518/702; 518/703; 423/385; 423/579
[58] Field of Search ................... 55/16, 74; 423/351, 423/579, 385; 518/702, 703; 585/946, 408, 733, 606

[56] References Cited

U.S. PATENT DOCUMENTS

| | | | |
|---|---|---|---|
| 3,894,102 | 7/1975 | Chang et al. | 260/668 |
| 4,044,061 | 8/1977 | Chang et al. | 260/668 |
| 4,058,576 | 11/1977 | Chang et al. | 260/673 |
| 4,385,193 | 5/1983 | Bijwaard et al. | 585/310 |
| 4,481,305 | 11/1984 | Jorn et al. | 518/705 |
| 4,492,774 | 1/1985 | Kibby et al. | 518/713 |
| 4,493,905 | 1/1985 | Beuther et al. | 502/325 |
| 4,507,404 | 3/1985 | Minderhoud et al. | 518/714 |
| 4,520,216 | 5/1985 | Skov et al. | 585/315 |
| 4,545,787 | 10/1985 | Hegarty | 55/74 |
| 4,594,468 | 6/1986 | Minderhoud et al. | 585/310 |
| 4,654,453 | 3/1987 | Tabak | 585/303 |
| 4,788,369 | 11/1988 | Marsh et al. | 585/408 |
| 4,955,993 | 9/1990 | Sanders, Jr. et al. | 55/16 |
| 4,964,886 | 10/1990 | Brugerolle et al. | 55/16 |
| 4,973,453 | 11/1990 | Agee | 518/703 |
| 4,975,190 | 12/1990 | Sakashita et al. | 210/500.23 |
| 5,023,276 | 6/1991 | Yarrington et al. | 518/703 |

FOREIGN PATENT DOCUMENTS

0261771B1 3/1988 European Pat. Off.
2179056A 2/1987 United Kingdom.

OTHER PUBLICATIONS

D. E. Brandt, "The Design and Development of an Advanced Heavy-Duty Gas Turbine", *Journal of Engineering for Gas Turbines and Power*, vol. 110, pp. 243-250 (Apr. 1988).

A. J. Scalzo, L. D. McLaurin, G. S. Howard, Y. Mori, H. Hiura, T. Sato, "A New 150-MW High-Efficiency Heavy-Duty Combustion Turbine", *Journal of Engineering for Gas Turbines and Power*, vol. 111, pp. 211-217 (Apr. 1989).

*Standard Handbook for Mechanical Engineers*, Seventh Edition, pp. 8-170 through 8-173.

"Membranes in Gas Separation and Enrichment", Fourth BOC Priestley Conference TP 242-B-62-(1978) pp. 44-63 and 342-350.

*Primary Examiner*—Anthony McFarlane
*Attorney, Agent, or Firm*—Pravel, Hewitt, Kimball & Krieger

[57] ABSTRACT

This invention comprises a method and apparatus for obtaining from air an oxygen enriched gas mixture containing at least 40 mole % nitrogen. The apparatus comprises a gas turbine, an oxygen separation unit which is in fluid communication with the turbine air compressor and means for maintaining a proper mass balance tolerance between the turbine compressor/unit and the turbine energy production unit.

This invention comprises a method and apparatus for recovering large quantities of an oxygen enriched gas from the volume of a compressed air stream produced by a gas turbine by compensation of the mass loss to the energy production unit section thereof by providing means for maintaining the turbine in proper mass and thermal balance as the turbine is utilized to provide the duty/power requirements of a process which utilizes the oxygen enriched gas stream as a reactant.

7 Claims, 3 Drawing Sheets

PROCESS FOR PRODUCING AND UTILIZING AN OXYGEN ENRICHED GAS

FIELD OF THE INVENTION

This invention relates to a process and apparatus for the production of low cost oxygen enriched air in large volume which may be used for converting carbonaceous starting materials like natural gas, naphtha, heavy oil, and solid carbonaceous materials like coal to a raw synthesis-gas having a substantial content of nitrogen, and to processes for converting such nitrogen containing raw synthesis gas to recoverable products, preferably to normally liquid carbon containing compounds which are suitable for fuel use or synthetic gasoline.

BACKGROUND OF THE INVENTION

Natural gas resources are located in many areas which are remote from means for transporting such natural gas conveniently and/or economically to a market. In many remote locations the natural gas is co-produced with crude oil and must be disposed of, by flaring or reinjection, in order to produce the crude. Flaring has become an unacceptable disposal method since it wastes a diminishing hydrocarbon resource and is also a source of air pollution. Reinjection, which adds to the cost of crude oil production, is often unacceptable both in view of its cost and the adverse effects it may impose upon crude oil production from the field itself. The inability to dispose of natural gas produced in association with crude at a remote location in a manner which is economically, governmentally and environmentally acceptable has brought crude oil production at some locations to a halt.

Carbon containing compositions, such as coal and natural gas, may be converted to other useful hydrocarbon forms by first converting the carbon composition to a synthesis gas. A synthesis gas is one containing at least hydrogen ($H_2$) and carbon monoxide (CO). A synthesis gas may be reacted over a variety of catalysts under various conditions to cause the $H_2$ and CO content thereof to react to form a variety of carbon containing compounds ranging from methanol ($CH_3OH$), dimethyl ether (DME), normally liquid hydrocarbons, etc. Methods for the production of synthetic gasoline and diesel fuel, whether by Fischer-Tropsch technology or by the Methanol to Gasoline (MTG) technology developed by Mobil, all require the production of a synthesis gas.

Two basic methods are employed to convert a carbon source to a synthesis gas, namely steam reforming or by adiabatic reaction of the carbon with an amount of oxygen less than the stoichiometric quantity required for complete carbon oxidation. Adiabatic reforming is the only possible method for materials boiling higher than naphtha. For natural gas and heavier material, up to naphtha, steam reforming (commonly over a nickel-containing catalyst) is the preferred method. Especially for ammonia production, but also in other cases, adiabatic reforming over such a nickel catalyst is also often practiced. The preparation of a synthesis gas by steam reforming non-adiabatically, that is with a large heat input, is a process attendant with large capital and high operating cost. Partial oxidation with or without catalyst present produces a synthesis gas of a lower hydrogen content than does steam reforming. In order to avoid the introduction of large amounts of nitrogen ($N_2$) as an inert diluent into the system (which is a desire for all targeted uses of synthesis gas, with the exception of production of ammonia), essentially pure oxygen must be used. Accordingly, production of an essentially nitrogen free synthesis gas by adiabatic reforming is also an intensive capital and operating cost process since an oxygen separation unit is required together with compressors of special construction required for the safe compression of gases containing 35 mole % or greater oxygen. Adiabatic reforming is generally employed in order to provide an operator flexibility for using different carbon feedstocks ranging form natural gas to readily volatizable hydrocarbon compounds.

Many proposals have been set forth for processes which would recover remote location natural gas in a normally liquid hydrocarbon form by converting it on location to a synthesis gas and then processing such synthesis gas by known methods to convert it to methanol or to other liquid hydrocarbon forms. Since the world market for methanol is insufficient to accommodate that quantity of methanol which would result by recovery of remote natural gas in this form, this manner of resolving the problem has not yet been practiced.

With the development in the mid 1970's by Mobil of a catalytic process for the conversion of methoxy containing compounds, such as methanol and DME, to gasoline grade liquid hydrocarbons, it appeared conceivable to recover remote natural gas on site in the form of a normally liquid hydrocarbon.

Such processes are intensive in their capital and operating cost, in large part due to the manner by which the natural gas is reformed to a synthesis gas and the need to match the synthesis gas pressure to the conditions required for its conversion to methanol and then to gasoline in the Mobil MTG process.

Nevertheless, as crude oil prices rose dramatically during the 1970's and sustained its high level in the 1980's it appeared that gasoline produced from natural gas which would economically compete with refined gasoline could be accomplished by coupling a conventional methanol production plant front end to a Mobil MTG process as the finish end.

In the early 1980's New Zealand, which then depended for its gasoline supply totally on imported crude oil products, undertook at a cost of about 1.2 billion dollars to construct a plant for production of gasoline from methane. The overall plant design comprised two main units, one for the production of methanol from methane, and the second using the Mobil MTG technology for converting methanol to gasoline. In effect, the New Zealand synthetic gasoline plant is two separate plants built side-by-side on common grounds.

Installation of the New Zealand plant was complete and operations commenced in 1985. At that time, crude oil prices had fallen significantly from their previous level and synthetic gasoline produced by the New Zealand plant was, and still is, economically uncompetitive with the price of refined gasoline; in major reason because of the cost, both capital and operating, associated with producing methanol from methane.

In an attempt to improve the economies of synthetic gasoline production using the Mobil MTG process Haldor Topsoe developed a process now commonly known as the Tigas process. The Tigas process integrates methanol synthesis and gasoline synthesis into a single process loop which eliminates the separation of methanol as a discrete intermediate product. To accomplish this integration, Tigas combines both strains of conventional wisdom prevailing in standard methanol production operations in order to eliminate the need to compress synthesis gas from a steam reformer to the pressure required for operation of a methanol plant. Accordingly, in the Tigas process, methane is first steam reformed in part at a pressure of about 30 to 50 atmospheres (440-730 psi) to a high $CO_2$ content precursor synthesis gas and the unreacted methane content of this precursor synthesis gas is then secondarily reformed by partial oxidation with essentially pure oxygen to produce a still $CO_2$ rich final synthesis gas having a pressure of about 28 to 48 atmospheres (410-700 psi). This final moderate pressure synthesis gas is then sent to a reactor containing a catalyst which is active for producing both methanol and dimethyl ether from the synthesis gas. Although this reactor operates at a somewhat lower pressure than does a methanol only reactor, because of its coproduction of dimethyl ether a high conversion of methane based carbon to combined methanol and dimethyl ether is still obtained. Total conversion of natural gas input carbon to a methoxy compound containing feed stream composition upon which the Mobil MTG process can operate is high. The methanol and dimethyl ether containing product gas stream is then reacted over a Mobil catalyst to convert the methoxy compounds thereof to liquid hydrocarbon compounds which are separated from the product gas stream and a portion of the residual overhead gasses containing unreacted hydrogen, carbon dioxide, methanol, ethane and olefins are recycled back to the inlet of the methanol/dimethyl ether reactor.

Although the Tigas design somewhat improves the economics for synthetic gasoline production from methane, it still requires a high capital cost steam reforming unit to which Tigas adds a requirement for a high capital cost oxygen plant to permit secondary reforming. The high capital cost required for a synthesis gas compressor is eliminated by Tigas in favor of a high capital cost oxygen plant to obtain in the tradeoff, a net reduction of capital and operating cost, after the obtainment of the synthesis gas, in the form of units of smaller duty size down stream. Though an improvement, given the current price for crude oil, the Tigas process is not economically feasible for synthetic gasoline production from methane in light of its high attendant capital cost.

Some variations to the basic Tigas process have been reported to further reduce the need for high capital cost items. One such variation is reported in U.S. Pat. No. 4,481,305. In this variation, an improvement in the economies of recycle is reported to be obtained compared to the standard recycle procedure described by U.S. Pat. No. 3,894,102 to be used with the Mobil MTG process. The improvement requires that adjustments be made to the composition of the synthesis gas feed to a methanol/dimethyl ether production reactor such that the synthesis gas feed will contain carbon monoxide and hydrogen in a $CO/H_2$ ratio of above 1 and contain carbon monoxide and carbon dioxide in a $CO/CO_2$ ratio of from 5 to 20. A synthesis gas of such composition may be obtainable from coal or a similar carbonaceous starting material. It is, however, not economically feasible to prepare a synthesis gas of such composition from methane using the Tigas process.

Even though synthetic gasoline production processes such as Fischer-Tropsch synthesis (FTS), standard Mobil and/or Tigas have undergone steady improvements intended to render them more economical to the production of synthetic gasoline from methane, they are today still unable to produce gasoline at a cost competitive to that refined from petroleum crude. This is so even where a source of low cost methane is conveniently located to or transportable to the synthetic gasoline production plant site.

Application of a currently existing process for conversion of remotely located natural gas to methanol and/or for synthetic gasoline production from natural gas is not economically feasible in view of the great capital cost associated with the equipment necessary to practice such processes.

In commonly owned copending U.S. patent application Ser. No. 508,928, a process is disclosed for converting natural gas to a synthesis gas using a low grade oxygen source, i.e., containing 50% or more nitrogen, which significantly lowers the capital cost of a methane to methanol, dimethyl ether or gasoline production plant. In one embodiment of the disclosed invention a gas turbine is utilized to power the compressors needed to compress methane and air in the process steps of the methane to synthesis gas conversion. In addition, the gas turbine provides a ready supply of compressed air in the range of about 8 to 16 atmospheres absolute. Compressed air from the turbine is bled off in an amount not exceeding the mass balance requirements of the turbine. The so compressed gas is then compressed in a secondary compressor, which may be powered by the energy output of the gas turbine, to the required 400 to 2000 psig oxygen gas compression requirement of the process. Thus, a primary compression of the oxygen containing gas of from about 8 to about 16 fold produced by the turbine is achieved at little or no cost. The remaining 1.8 to 17 fold compression required of the secondary compressor can be achieved at considerable savings over the 28 to 137 fold compression which in the absence of the gas turbine would be performed on the oxygen containing gas by conventional gas compressor units.

As further described in copending U.S. Ser. No. 508,928, the economics and efficiencies of the process of converting natural gas to a recoverable normally liquid hydrocarbon can be further improved by preparing the synthesis gas with an oxygen enriched gas having up to 50 mole % oxygen.

Such oxygen-rich gas normally contains nitrogen as its other main component. Presently there are three different ways to arrive at such a gas, normally described as oxygen-enriched air.

Smaller amounts of such gas are made by preferential diffusion of oxygen over that of nitrogen through an appropriate membrane. In order to drive that diffusion, air is compressed and then fed to the diffusor unit. This diffusor unit can employ flat membranes, but it is often preferred to use a large number of small hollow membrane fibers. Either the compressed air is fed to the inside or to the outside of the membrane fibers. When fed to the inside, the fiber can be thin-walled. This helps the diffusion, but limits the maximum pressure to about 150 psig. It is also possible to feed the compressed air to the outside of the fibers. Then the wall of these fibers has to be thick enough to withstand the pressure. This leads to the use of higher pressures, but the greater wall thickness slows the rate of diffusion down. It should be clear, that the air compression is a cost factor, but higher compression within the limits of tolerance speeds up the diffusion, thus lowering the cost of the fiber material. In practice, optimization of these two effects has led to compression of air to 8 atmosphere gage (atg), followed by a rather intensive use of the amount of air.

The residual gas, or "spent air" commonly contains little more than 7% oxygen. The cost of the air compression, both in capital and in operation, is substantial. The cost of the membrane fiber material, together with a containment vessel therefor and the necessary air filters, is mostly capital only. Enriched air made this way has a very high oxygen equivalent cost, well over $50 per metric ton. The term "oxygen equivalent cost" derives from the assumption that the same amount of enriched air can also be made by adding pure oxygen to air. When assuming air to have no cost, the cost of the enriched air is the cost of that amount of pure oxygen which must be added to produce an equivalent volume.

While a membrane diffusion method is commonly used for preparation of small amounts of such enriched air, larger quantities may be produced by pressure swing absorption (PSA). Here compressed air is contacted with an absorbent that preferentially absorbs oxygen. As soon as the absorbent is saturated to a reasonable degree with oxygen, the flow of the pressurized air is stopped and the pressure reduced to atmospheric and oxygen is desorbed. Thus mainly oxygen is produced, be it at low pressure. The term pressure swing derives from the alternating of pressurized absorption and low pressure desorption.

The cost of oxygen made by PSA, is much lower than with diffusion. However, the PSA cost is still substantial. For still larger amounts of oxygen, say 500 metric tons per day (MTPD) and higher, cryogenic separation of oxygen is the preferred method. Then the cost of oxygen at present can be brought down to the zone of $25 to a $35 per metric ton.

Hegarty U.S. Pat. No. 4,545,787 describes a process wherein an oxygen enriched gas may be prepared at low utility cost—for the volume produced—by the incorporation of an oxygen permeable membrane separation unit or PSA with the operation of a gas turbine operated for power generation. Unfortunately, in view of the mass and thermal balance tolerance constraints which must be observed for proper operation of the gas turbine, the process described by Hegarty only provides for the separation of a minor amount of oxygen from a portion of the compressed air provided by the turbine.

Feeding air at 11 atmospheres absolute (ata) to a membrane with a gas separation factor for $O_2$ versus $N_2$ of 5.55 can provide a permeate stream of about 54% $O_2$ in a volume amount of about 1.5% of the volume of feed air. The same membrane can produce a 49 mole% $O_2$ permeate in a volume amount of about 17.6% of the volume of the feed air, or a 40 mole% permeate of about 40.5% of the volume of the feed air. In the last 8%. In each case the balance of the $O_2$ enriched permeate gas is comprised essentially of $N_2$. Theoretically, if all $O_2$ of the feed air is extracted into the permeate the permeate will be about 35 mole % $O_2$ and be of a volume of about 50% that of the feed air.

Hegarty U.S. Pat. No. 4,545,787 proposes to compensate for the disruption to the thermal balance between the compressor and expander side of a gas turbine which is caused by the recovery of $O_2$ from the compressed air by increasing the amount of air compressed by the compressor side in a quantity equal to the amount of $O_2$ diverted into the permeate $O_2$ enriched gas stream. Hegarty proposed that this maintains the same molar flow to the expander side as would be the case had no $O_2$ been recovered.

Turbines are designed to pass all air compressed in the compressor side to the expander side. In normal operation the only mass imbalance between compressor to expander side is due to the mass increase caused in the expander side by reason of fuel supplied to the combustion chamber of the expander side. The turbine design provides for this positive mass imbalance and further for a safety factor of a positive mass imbalance preferably no greater than a 10% increase of mass in the expander side. The operation of a turbine in a manner which exceeds the positive mass imbalance safety limit, or which produces a negative imbalance by decreasing mass flow in the expander side, will result in a significant lessening of its service life and even to its total failure.

Even were one able to put Hegarty's proposal to practice, for the same amount of fuel input to cause the compressor side of the turbine to compress additional quantities of air equal in an $O_2$ amount to the $O_2$ recovered, Hegarty's method would not maintain the turbine in a tolerable mass balance even if the requirement of thermal balance were met. Hegarty simply does not address nor consider the problem of proper mass balance.

For example, with a membrane having a gas separation factor for $O_2$ of 5.55 employed in Hegarty's method with a turbine compressing 1000 lb.-mole/hr air (21% $O_2$, 79% $N_2$) which is 314% of that amount required for fuel combustion (33.44 lb.-mole/hr $CH_4$), without Hegarty's proposed additional air compression the mass imbalance of the turbine would be negative and would exceed 10% when the $O_2$ recovery reaches or exceeds about 64.3 lb-mole/hr $O_2$ since the permeate would also contain about 48.7 lb-mole/hr $N_2$. Following Hegarty's proposal to compress an additional quantity of air equal to the extracted $O_2$ would produce a negative mass imbalance of 16%; compression of an additional quantity of air equal to the sum of the $O_2$ and $N_2$ lost in the permeate would produce a negative mass imbalance of 19.5%.

It is evident that one of two realities will quickly become apparent to one who attempts to practice the process of Hegarty, namely that either the quantity of $O_2$ produced must be limited to a small quantity to prevent an intolerable mass imbalance or the turbine must be sacrificed to a short service life or even failure.

Accordingly, even in view of Hegarty's proposal, the fact remains the same today that membrane $O_2$ enrichment is economically viable only for production of small quantities of $O_2$; for medium volume amounts of produced $O_2$ a pressure-swing absorption method of $O_2$ production is viable and wherein large quantities of $O_2$ are required an efficient but capitally intensive cryogenic method for $O_2$ production is still the most economically viable process for production of such large quantities.

There is still a need for a method of production of useful $O_2$ in large volumes at a production cost significantly less than that available by conventional methods. Such a method would allow the use of an oxygen enriched gas for the improvement of many industrial scale processes to provide valuable products at significantly reduced production cost.

SUMMARY OF THE INVENTION

This invention comprises a process and apparatus for the production of a gas mixture of oxygen and nitrogen which, in comparison to air, is enriched in oxygen. The degree of oxygen enrichment obtained, considered on the basis of the amount of pure oxygen which would be required to be added to a quantity of air to provide a gas mixture of similar volume and of equivalent mole % oxygen, is obtained at a significantly reduced cost than that which could be provided by conventional methods of oxygen generation.

The invention comprises a technique for separating air into an oxygen-rich gas stream and an oxygen-poor gas stream, using a gas turbine to provide pressurized air as feed to the device that separates the pressurized air into the two desired streams.

Two types of oxygen enrichment units can be used to achieve the desired separation, namely pressure swing absorption (PSA) and diffusion through a membrane, which preferentially passes oxygen through over nitrogen.

Especially when using a diffusion unit, the oxygen enriched gas stream obtained will contain appreciable amounts of nitrogen. It is part of the invention to show how such oxygen enriched gas, containing at least 40% nitrogen, is useful for processes in general. It will be shown how such oxygen enriched gas which may be utilized to produce a raw synthesis gas can be utilized for the production of a number of marketable products, like methanol, gasoline, kerosene, diesel, ammonia, and others. Further described is how the integration of the production of oxygen-rich gas with the different processes can lead to an attractive use of the final bleed stream out of such processes as fuel for the gas turbine which provides the pressurized air for the production of the oxygen-rich gas stream.

The reason for the lower cost of the oxygen enriched air produced by this invention is that the pressurized air, produced in the compressor unit of the gas turbine, is only partly necessary for combustion of the turbine fuel. The rest of the air, which is used for cooling, can be used as feed for the diffusor device at no extra cost. It can be available at a substantially higher pressure than in standard diffusor unit, where economic considerations decide the compression ratio. Finally, it is not necessary to diffuse out as much oxygen as possible, as sufficient compressed air generally is available. The final oxygen concentration in the spent air is generally substantially higher than in a stand-alone diffusor unit. The gas, diffusing through the semipermeable membrane, contains at least 40% nitrogen. This gas may be immediately reduced in oxygen content by mixing with air, fed in for this purpose.

The diffused gas, or the gas obtained from it by mixing with air, may be utilized to reform carbonaceous starting materials like natural gas, naphtha, heavy oil, and solid carbonaceous materials like coal, by adiabatic reaction to a raw synthesis gas containing at least $H_2$, CO, and a substantial quantity of $N_2$. Many carbonaceous starting materials are available for the use in this invention. Without eliminating the possible use of this invention to heavier starting materials, the use of low-cost natural gas, such as remote natural gas, is the most attractive. The $N_2$ containing raw synthesis gas may be modified to adjust its compositional makeup to that which is most suited to its conversion to final marketable products, such as methanol, gasoline and diesel grade normally liquid hydrocarbon, ammonia, and others. The vent or tail gas remaining after the product taking operation comprises some unreacted $H_2$, and/or some $CH_4$; in many cases the tail gas also contains CO but that depends on reaction conditions. Other hydrocarbons than methane may also be present. The vent or tail gas is utilized as fuel gas for powering a gas turbine which in turn supplies the power/energy/driving requirements for production of the oxygen enriched gas stream and other process requirements for synthesis gas production and conversion thereof into final products.

The integration of the gas turbine with an oxygen enrichment unit for the production of a raw synthesis gas which is then processed to final products requires that careful consideration be given to means within the overall processing scheme for complying with the mass and thermal balance tolerances required for proper gas turbine operation. This invention provides means for complying with the mass and thermal requirements of the gas turbine even though the volume of oxygen enriched gas separated from the compressed air provided by the turbine and hence diverted from the operation of the turbine is greatly in excess of that which has heretofore been possible when considering the mass and thermal balance requirements needed for operation of a turbine in its normal mode.

Further, depending upon which final product one desires to produce from the raw synthesis gas, the processing methodology applied to a conventionally produced synthesis gas, from which significant quantities of $N_2$ are absent, is modified in various respects, as will be explained, by reason of the presence of significant amounts of $N_2$ in the raw synthesis gases produced in accordance with this invention.

In broad overview, this invention comprises a method and apparatus for the production of oxygen enriched air—i.e. an oxygen containing gas having at least 40 mole % nitrogen—which provides low cost oxygen in large volumes. The apparatus comprises a gas turbine in integration with an oxygen separation unit, preferably a diffusion membrane unit, and means for complying with the mass and thermal balance tolerance requirements for proper and safe operation of the gas turbine. The low cost oxygen so produced may be utilized to increase the efficiency of other process operations which require oxygen, such as a combustion operation for the generation of electrical energy or the Claus Process. Preferably the low cost oxygen is utilized in the reforming of a carbon source, such as natural gas, by adiabatic reaction to a raw synthesis gas. The raw synthesis gas is preferably processed to a normally liquid hydrocarbon such as; methanol by reaction over a methanol catalyst; or methanol and dimethyl ether (DME) over a methanol/DME catalyst which in turn is reacted over a Mobil catalyst to produce normally liquid hydrocarbon products; or to gasoline/diesel grade hydrocarbons by reaction under Fischer-Tropsch Synthesis (FTS) conditions. Alternatively, since the raw synthesis gas produced by this process is of a high $N_2$ content it may be utilized for the production of ammonia by reaction over a ruthenium-based catalyst. However processed, the tail gas remaining following the last take of product compounds is preferably utilized as fuel gas for the gas turbine.

The method of this invention eliminates the need for steam reforming and/or adiabatic reforming with essentially pure oxygen of the natural gas to a synthesis gas. In accordance with the process of this invention, a synthesis gas may be produced at an operating pressure suitable for conversion thereof to methanol and/or dimethyl ether with little or no need for synthesis gas recompression. Further, processing conditions are so chosen that the vent or tail gas from the overheads after conversion to the crude product methanol/DME and/or its conversion to gasoline grade liquid hydrocarbons, generally has a BTU value required to serve as a fuel gas for supplying the energy needed for operation of the gas compression equipment requirements by which the process of this invention may be practiced. In some cases a small amount of natural gas may be added to the final tail gas to increase its fuel value. Accordingly, the capital and operating cost associated with the production of methanol, DME and gasoline from natural gas by a Mobil MTG process is significantly reduced by the method of this invention and renders it economically feasible for natural gas recovery processing at remote locations.

Further, the process and apparatus of this invention may be utilized for the production of a synthesis gas which is reacted under Fischer-Tropsch Synthesis conditions to a hydrocarbon mixture containing appreciable quantities of waxy materials; these waxy materials can be hydrofined to a high quality diesel fuel of normally liquid composition. The utilization of the process and apparatus of this invention requires a modification of the standard scheme of the Fischer-Tropsch processing to accommodate the FTS to operation on the synthesis gas of the present invention which contain appreciable amounts of nitrogen.

An oxygen enriched gas is obtainable at low costs from compressed air from the compressor of the gas turbine employed in the process to power the compressor and heat exchangers required. Air compressed from about 8 to about 16 atmospheres absolute is withdrawn from the high pressure side of the gas turbine compressor and passed through an oxygen separation unit which is preferably a semi-permeable membrane that is selective to oxygen over nitrogen. Contacting the compressed air with the membrane yields a low pressure oxygen enriched permeate gas stream and a high pressure oxygen depleted non-permeate gas stream. The oxygen depleted gas stream is returned to the combustion unit of the turbine to partially restore the mass balance through the energy production unit turbine. The produced oxygen enriched gas stream is available for use in other process steps of the invention. The semi-permeable membrane which may be employed in the invention may produce an oxygen enrichment in excess of 35 mole %. When the oxygen enriched gas requires recompression for its subsequent utilization, it is preferred to utilize it at 35 mole % $O_2$ or less in order to avoid the need for compressors of special construction. Accordingly, when the membrane process is operated to produce a permeate gas enriched to greater than 35 mole % $O_2$, provision is made to dilute the permeate gas with air to obtain an oxygen enriched gas stream of 35 mole % $O_2$ or less. Preferably, this dilution is performed at the membrane surface by passing a continuous air stream over the oxygen enriched or permeate side of the membrane. In this manner, two purposes are served, the first being the preferred dilution to an oxygen content of about 35 mole % $O_2$ or less. The second purpose is to maximize the $O_2$ partial pressure gradient across the diffusor membrane, thereby providing a maximum throughput of oxygen through the diffusion unit, albeit oxygen in the resulting gas stream is in more dilute form than otherwise obtainable.

To further maximize the oxygen transported across the membrane, the diverted compressed air from the turbine compressor may be further compressed above the compression performed by the gas turbine compressor. The steeper pressure gradient across the membrane increases the overall rate of oxygen throughput of the system.

In a primary embodiment of this invention the oxygen enriched gas is passed to an adiabatic reactor to which natural gas is supplied and the natural gas there reacts with a quantity of an oxygen enriched gas containing greater than 21 mole percent oxygen and at least 40 mole percent nitrogen such that, upon the completion of the reaction, a raw synthesis is produced having a temperature between 1800° and 2500° F. and at least about 90 mole percent of the natural gas hydrocarbon carbon content is converted to carbon monoxide and carbon dioxide and about 1 to about 10 mole percent of such natural gas hydrocarbon carbon components are present in the reformed gas as methane.

This raw synthesis gas may then be treated in various ways to particularly accommodate it to various processes by which its $H_2$, CO, and $N_2$ content may be made to undergo reaction to form different products, such as methanol, dimethylether, synthetic gasoline, synthetic diesel fuel, ammonia, etc. For instance, for methanol or methanol to gasoline processing, the raw synthesis gas is dewatered and thereafter processed according to the methods disclosed in commonly owned copending U.S. patent application Ser. No. 508,928. For processing by Fischer-Tropsch reaction the raw synthesis gas is first subjected to a degree of a water-gas shift reaction to adjust its $H_2$:CO ratio to that most preferred for the Fischer-Tropsch reaction. This is followed by $CO_2$ removal at some point in the process. However the raw synthesis gas is modified, by reason of its substantial nitrogen content, certain modifications need to be made to the processes in which it is subsequently used.

The use of an oxygen enriched gas results in process efficiencies over a process which uses air as disclosed by commonly owned U.S. patent application Ser. No. 508,928. More complete reaction is obtained in the adiabatic reforming stage of the process and at the same time less additional work is performed to compress the lesser amount of nitrogen present in the synthesis gas during its utilization in subsequent process operations. To prepare the raw synthesis gas to be of a composition most suitable for methanol production the raw synthesis gas is cooled to condense $H_2O$ and $H_2O$ is removed from it. The presence of a substantial mole percent of inert $N_2$ in the synthesis gas composition has, surprisingly, been found not to greatly affect a need to increase the pressure required to convert the carbon monoxide and hydrogen components therein to methoxy compounds, particularly methanol and DME compounds, by contact with catalyst compositions typically employed to affect such conversion with a synthesis gas having a low $N_2$ content as prepared by steam reforming, adiabatic reforming with essentially pure $O_2$ or a combination thereof. When making only methanol, the absence of need to greatly increase the pressure follows from the decision to accept a slightly lower conversion of carbon to a methoxy containing product compound. The negative effect of this lower conversion combined with the low cost of remotely located natural gas is more than outweighed by the lower capital cost resulting from the use of a high nitrogen content oxygen enriched gas to form the synthesis gas which eliminates the need to prepare the synthesis gas by steam reforming or adiabatic reforming with essentially pure oxygen. Further the need to compress the synthesis gas to a pressure necessary for conversion to methanol with standard methanol catalysts may be significantly reduced or even totally eliminated. This significantly reduces or eliminates the capital equipment costs associated with the need in standard methanol production methods for compressing the synthesis gas prepared by steam reforming or adiabatic reforming with essentially pure oxygen to the pressure needed for conversion to methanol. Beneficially, the high nitrogen content of the synthesis gas allows plug flow conversion to methanol in two or three reactors in series, thus eliminating the costly recycle routinely practiced in conventional methods for methanol production.

For the case of combined methanol-DME manufacture, the preferred pressure range is similar to that of the standard methanol process, notwithstanding the large $N_2$ content of this synthesis gas. This is especially the case when first methanol is prepared and separated in one or two steps before contact of the remaining synthesis gas with a methanol-DME catalyst to prepare a methanol-DME mixture. The advantage of being able to use plug flow reactors also applies in this case and is important.

Accordingly, this discovery permits production of methanol and/or DME from natural gas using standard methanol/DME catalyst compositions and conversion technology but without the need for employing a high capital cost steam reformer or a high capital cost oxygen plant as are required in methanol conversion units of conventional design, and this without greatly increasing the capital cost of the rest of the process facility.

As an alternative to conversion to methanol only or the production of gasoline by a Mobil MTG process, the raw synthesis gas produced by this process can be conditioned for use by Fischer-Tropsch processing into high grade diesel fuel. For this application the raw synthesis gas is partially water gas shifted to react a portion of its CO content with its water content to provide a gas composition wherein the ratio of $H_2$:CO is from about 1:1 to about 3:1 preferably about 2.02:1 to about 2.4:1. Following the water gas shift, the resulting gas mixture is preferably first contacted with a medium which extracts $CO_2$ therefrom to yield a gas mixture in which $CO_2$ is present in a quantity of 1 mole % or less and this gas mixture is then reacted under conditions and over a catalyst that promotes the Fischer-Tropsch reaction between $H_2$ and CO to form a hydrocarbon mixture, ranging in composition from a low to high carbon number, finally being in the paraffin to waxy range, and the hydrocarbons formed are condensed by cooling. The balance of the gas is then mixed with the earlier recovered $CO_2$ and subjected to a reforming reaction under heat input. Heat may be provided by the hot gas stream made by the adiabatic reaction. The gas stream resulting from this second reforming step is enriched in hydrogen. $CO_2$ is removed, and a second enriched in Fischer-Tropsch step is taken, likewise resulting in a partial waxy product. The recovered hydrocarbons from the first Fischer-Tropsch step are added back in and the combined stream is subjected to hydrocracking conditions wherein the remaining $H_2$ content of the gas stream reacts with the paraffinic/waxy hydrocarbon portions to convert it to a normally liquid hydrocarbon compound in the carbon number range of diesel fuel. It is also possible at a limited loss in yield to eliminate the first $CO_2$ removal step. The tail gas from the hydrocracking unit is then returned to the gas turbine as fuel.

Whether the process of this invention is utilized solely for crude methanol production, or whether it is used in combination with a Mobil MTG unit for production of gasoline, or whether it is used in a Fischer-Tropsch process for production of diesel grade fuels the final overhead gas from the finish end of this process contains a sufficient BTU content to be utilized to supply most, all or in excess of the fuel BTU/scf gas energy required for operation of the gas turbine for production of operational power and for equipment operation needed in the practice of this process.

In addition, when the raw synthesis gas is utilized for the production of a hydrocarbon containing product compound, the overhead gas contains all of the nitrogen which was initially diverted from the compressor unit away from the energy production unit of the gas turbine as a component of the oxygen enriched gas stream. This nitrogen is returned to the energy production unit of the turbine in the final overhead gas fuel therefor and is present to aid in the proper preservation of the mass balance of the gas turbine power plant. Accordingly, the return of this $N_2$ with the tail gas as fuel for the turbine allows for a greater volume production of the $O_2$ enriched gas stream in the first instance. The inert nitrogen content of the fuel produces a like cooling effect in the energy production unit as the compressed air from the unit. Thus, the thermal balance requirement, a feature of all gas turbines, is restored to near that which would occur if none of the oxygen and nitrogen of the turbine compressed air stream were withdrawn from the turbine for use in downstream units of the overall process.

One aspect of the gas turbine operation cannot be overlooked. The present invention proposes to monitor the final temperature of the cooled flame effluent, the so called turbine inlet temperature (TIT), closely. Assuming that to be unchanged from a standard operation, it is also self-evident that the nitrogen dilution of the fuel leads to a lower flame temperature. In most gas turbines sufficient volume is provided for the formation of the flame and the after-oxidation expansion of the oxidized primary product so that dilution of the fuel with nitrogen can be tolerated. In cases where the dilution is large and the gas turbine has a relatively small volume for formation of the flame, it would be necessary to provide a larger flame volume. This is possible at very limited cost in those gas turbines which have outside combustion unit. Then it is easy to provide a somewhat larger fuel chamber to counteract the lower flame temperature. When the fuel chamber is very limited by the geometry of the design, nitrogen dilution may be limited.

In those embodiments of the process which utilize a quality of air as a diluent or stripper air to flow across the permeate side of the oxygen diffusion membrane unit, control of the quantity of stripper air supplied provides a means for maintaining the thermal and mass balance requirements of the turbine within the tolerance constraints required for proper turbine operation. In this circumstance, since all of the nitrogen initially diverted from the energy production unit of the turbine by reason of its diffusion into the enriched oxygen stream is ultimately returned to the energy production unit in the tail gas fuel, the difference in mass and thermal balance between compressor and energy production units of the turbine compared to normal turbine operation is represented by that amount of diverted $O_2$ which is consumed by chemical reaction and diversion out of the overall process loop as separated water or in methoxy type products. Accordingly, the quantity of stripper air may be regulated as a means to make up for this deficiency by supplying a quantity of $N_2$ in an amount necessary to bring the mass and thermal balance of the gas turbine back within tolerance limits.

In those embodiments of the process wherein the $N_2$ content of the oxygen enriched gas is not entirely returned to the gas turbine in the fuel supply therefor, such as wherein the $N_2$ in the raw synthesis gas is utilized as a reactant, and hence the amount of $N_2$ returned to the energy production unit in the tail gas fuel is reduced, such as in utilization of the synthesis gas for production of ammonia; or in those embodiments wherein of the oxygen gas is utilized for increasing the throughput capacity of a Claus unit; low pressure steam can be added to the gas fuel for the turbine to make up the $N_2$ deficiency and by this means the thermal and mass balance of the turbine is maintained within tolerance. Such low pressure steam is invariably available in an ammonia or Claus production process.

At times the BTU content of the final overhead gas may exceed all of the compression and heat exchange requirements for the process and excess power can be produced for export from the process, for instance in the form of electricity. In that case, other excess heat in the process can be used to generate steam and thus provide more power for electricity generation.

In the most preferred embodiments of the process, the final vent or tail gas from the finish end of the process is recycled as fuel to the energy production unit of the gas turbine, wherein by complete combustion with compressed air, driving energy requirements are supplied for at least a first step of compression of the oxygen enriched gas used in this process and also for the operation of the gas compressors by which the natural gas stream and the oxygen enriched gas are compressed to the final pressures desired for the reaction therebetween which provides the carbon monoxide and hydrogen containing raw synthesis gas.

BRIEF DESCRIPTION OF THE DRAWINGS

In the different figures like parts are identically numbered.

DETAILED DESCRIPTION OF THE PREFERRED EMBODIMENT

This invention comprises a method and apparatus for obtaining from air an oxygen enriched gas mixture containing at least 40 mole % nitrogen. The apparatus comprises a gas turbine, an oxygen separation unit which is in fluid communication with the turbine air compressor and means for maintaining a proper mass balance tolerance between the turbine compressor/unit and the turbine energy production unit. The method comprises supplying compressed air from the outlet of a compressor unit of a gas turbine to an oxygen separation unit, preferably to a membrane diffusion unit, wherein by preferential separation the gas components become separated into a lower pressure oxygen enriched permeate gas having at least 40 mole % of $N_2$ and to a high pressure oxygen depleted non-permeate gas which is provided to an energy production unit of the gas turbine, method means for matching the mass balance between the compressor and energy production units of the gas turbine to comply with a tolerance for mass imbalance of the turbine as determined by a thrust bearing of the turbine, and method means for obtaining the thermal balance required in the energy production unit of the turbine.

The Gas Turbine

Figure 1:
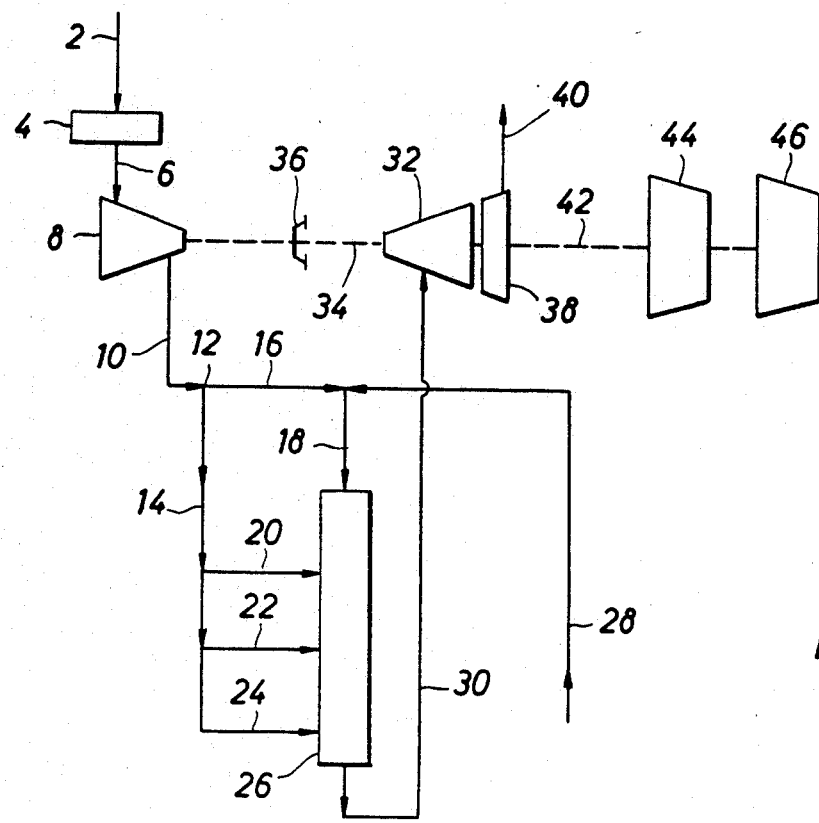
FIG. 1 schematically illustrates a gas turbine.

Basically, a fuel turbine comprises an air compressor unit and an energy production unit. With reference to FIG. 1, the energy production unit comprises a combustor unit 26 in which a fuel supplied by line 28 is completely oxidized to provide a combustion gas, a first expander unit 32 through which the combustion gases are first expanded to provide the energy needed to drive the air compressor unit 8 by a shaft 34 carrying a thrust bearing 36 between the first expander unit and the air compressor unit, and a further secondary expander unit 38 through which the combustion gases which were first expanded in the combustor expander unit 32 are further expanded to provide a driving force which, by mechanical linkage 42 to the secondary expander unit 38, can operate other items of equipment such as compressors, electrical generators, and the like, as denoted by units 44 and 46.

Turbine designs initially evolved as a power source for powering jet aircraft, wherein the gases exhausted through the secondary expander unit 38 of the energy production unit provided the motive force to propel an aircraft. As designed for aircraft propulsion a turbine operates on a liquid hydrocarbon fuel source wherein the oxidization gas source—air—is compressed by the compressor unit in an amount which, is 4:1 in older aircraft turbine designs, and 3:1 in more recent aircraft turbine designs, that of the stoichiometric amount of $O_2$ needed to completely oxidize the turbine fuel source.

Aircraft turbine designs contemplate that all air compressed by the compressor unit 8 thereof is fed to the energy production unit, in various proportion to the combustor unit itself as by line 16 and 18 and the remainder to the combustion gases as a gas temperature control fluid, as, for example by lines 20, 22 and 24. In turbines of an aircraft design there exists an inherent mass imbalance between the air compression unit of the turbine and the mass total which flows through the energy production unit. This imbalance resides in the fact that an additional quantity of mass must be supplied to the energy production unit as fuel, per line 28. Accordingly, the design of a turbine for aircraft production accounts for this mass imbalance in the design of the turbine itself.

On the shaft 34, coupling the air compressor unit 8 to the first expander 32 of the energy production unit, a thrust bearing 36 is placed, which allows for up to a 10% increase in the mass fed to the energy production unit over that fed to the air compressor unit. This bearing is necessary, because addition of the fuel increases the mass flow through the energy production unit, which increase will vary with the mass variation in the fuel flow. With aviation fuel or pure methane the mass increase is less than about 2%, but with poorer fuels the mass of fuel for the same total heating value can increase substantially. The 10% value is sufficient for standard operation of a turbine.

After the design of turbines for aircraft propulsion had been resolved, other non-aircraft uses of such turbines were devised. In uses such as the motive means for generation of electrical energy or operation of other items of equipment a carbonaceous fuel other than an aviation grade liquid hydrocarbon may be, and preferably is, used. Such other fuel sources contemplate natural gas, i.e., methane, as a fuel for the turbine, and it is such a turbine which herein is referred to as a "gas turbine." That is, any turbine which operates with a normally gaseous source of a carbon based oxidatable fuel is hereinafter referred to as a "gas turbine." Such gaseous fuel source may be a high grade BTU/SCF gas, like methane, ethane, propane, butane, or analogous unsaturated hydrocarbon compounds or mixtures thereof, or other carbon containing compositions. Also, within the context of the invention herein described, the fuel source of such gas turbine may be a lower BTU/SCF gaseous source which contains, for example a significant content of oxidizable inert normally gaseous compounds, such as $N_2$, $CO_2$, or water vapor (steam), in conjunction with oxidizable compounds, such as $H_2$, CO, a hydrocarbon whether saturated or unsaturated and whether or not a hydrocarbon derivative such as methanol and/or dimethylethyl or other oxidizable carbon compound based compound.

In any event, a turbine if of conventional design for aircraft propulsion—whether operated on a normally liquid hydrocarbon fuel or on a normally gaseous carbon based fuel source, is typically designed with a thrust bearing 36 capable of a maximum tolerance of a 10% increase in mass in the energy production unit over that mass of air fed to the air compressor unit. This design constraint dictates the directional positioning of the thrust bearing by which this design tolerance is maintained.

The thrust bearing 36 of a turbine of such design does not protect against a lower mass flow to the energy production unit. If that is expected, a reverse thrust bearing of the right capacity should be placed on the shaft connecting the air compressor with the first expander of the energy production unit.

It is important to note that the gas turbine has several operational requirements. In the first place the flame generated in the combustion unit 26 has to substantially convert all the fuel into combusted products. In the conventional design of the combustor unit 26 a substantial latitude is normally built in. In other words the manufacturer of the gas turbine has allowed for burning of both better and poorer quality fuels. Of course this is within certain reasonable limits. If the fuel becomes very poor, the burner volume will not be sufficient. Burning is governed by partial pressures of fuel and oxygen, together with temperature. At low oxygen partial pressure and low temperature the given volume of the burner may not be sufficient. It is therefore important for this invention, in which low quality fuels may be used, to have the possibility for increasing the volume of the burner. This is relatively easy with turbines of an outside burner chamber design and much more difficult, if not impossible, for gas turbine designed with combustion units which are built into or practically built into the first expander sector.

A very important further point in the operation of the gas turbine is that the temperature of the gases exiting the combustor unit has to be controlled closely to the design temperature. A lower temperature obviously results in loss of energy provided. A higher temperature than the design seriously reduces the service life of the turbine. Temperature control is effected by continuous determination of the heat of combustion of the fuel and control of the amount of air and fuel, together with temperature of both.

In standard gas turbine operation, the turbine inlet temperature (TIT) is kept close to the maximum permissible TIT set by the turbine design by monitoring the heating value of the fuel. Slight changes in that heating value are compensated by small variations in fuel flow.

In this invention the amount and heating value of the tail gas stream out of the process are both monitored. The inlet temperatures of all gas streams to the combustor unit are adjusted to obtain a TIT within 200° F. of and not exceeding the maximum permissible TIT of the turbine design.

As already stated, the normal design of a gas turbine does allow for up to a 10% increase in mass between the compressor unit and the energy production unit. When gases are taken out of the compressor unit and/or highly diluted fuels are used, one may either obtain a reverse thrust, due to a lower mass flow to the energy production unit in the first case, or a higher than 10% mass flow difference in the case of highly diluted fuel. This last case is important when tail gases of low BTU content are used as fuel for the turbine. Proper thrust bearing changes have to be made to accommodate these changes.

When utilizing a turbine of typical design for production of an $O_2$ enriched gas stream, the limits on the amount of the $O_2$ enriched gas stream which can be produced are governed by the positive thrust bearing tolerance of 10%. One means for increasing this limiting factor is to replace the typical thrust bearing 36 with one designed for a greater positive mass imbalance than 10%.

Finally, especially when using tail gas streams processes as fuel for the turbine, as will be discussed with reference to FIG. 2, the task of the combustor unit 26 has to be examined closely. The standard design of gas turbines allows use of fuels of lower heating values than standard natural gas. Heating values of 100 to 300 BUT per SCF are considered acceptable in some, if not all gas turbines. Still lower values definitely would call for larger combustion chambers. This necessity derives from the fact that given a total unchanged mass flow and a final constant temperature in the exit of the combustor unit, the flame temperature is lowered when a larger part of the total mass is directly fed into the flame. Also, that extra mass dilutes the reacting species in the flame, both combustants and oxygen. A compensating factor can be the composition of the tail gas stream. When it mainly consists of hydrogen and CO, the burning will initially convert the hydrogen to steam. This process is very fast. The steam formed will undergo a watergas shift to convert the CO into $CO_2$ and more hydrogen. This process is also reasonably fast. Only methane present may burn rather slowly. The result can be a substantial increase in size. This does not lead to a costly change of the turbine combustor unit design in cases where sufficient space is available. Wherein it may be necessary to use a combustion chamber of increased volume it is especially easy when an outside combustor unit is used for the combustion. It is more difficult when the combustor unit is directly integrated with the first expander sector. Another possible solution in the use of highly diluted fuels would be the use of sintered high temperature catalysts to promote the combustion in a limited space. For changing the combustor volume determination of the burning rate under the expected burning conditions will provide the necessary design input.

In normal turbine operations that amount of air compressed in the compressor unit, whether to a pressure of 8, 12, 16 or higher absolute atmospheres, depending on the particular design of the turbine, is all supplied to the energy production unit either as oxidization gas 18 for fuel combustion in the combustor unit or as cooling gas 20, 22 or 24 for temperature control of the combustion gas which is expanded through the first 32 and second 38 expanders of the production unit. Some gas turbines are designed for an air to fuel ratio of 3:1 and some for 4:1, wherein the amount of air compressed by the compressor unit and supplied to the energy production unit is 3 times or 4 times that required to provide the stoichiometric quantity of oxygen required for complete oxidation of the fuel. Accordingly, in 3:1 turbine design, which type turbines provide for air compression ratios of 12:1 to 16:1 or greater, for each mole per hour of methane fuel supplied about 30 moles per hour of air is compressed in the compressor unit; in a 4:1 turbine which provides for an air compression ratio of about 8:1, for each mole per hour of methane fuel about 40 moles per hour of air is compressed. In a 3:1 turbine, the mass imbalance between compressor and energy production units is about 1.9%, in a 4:1 turbine it is about 1.4%, the imbalance reflecting the addition of fuel to the energy production unit. Accordingly, gas turbines are designed to accommodate this mass imbalance, and as a safety feature of a conventional performance design provide for safe operation at an imbalance of up to 10%. A gas turbine of conventional design must be operated within this design constraint.

Accordingly, the amount of oxygen and nitrogen which can be diverted from the compressor unit from flowing to the energy production unit side in the form of an oxygen enriched gas stream is limited in quantity by this mass imbalance limitation of the turbine thrust bearing unless means for making up the deficiency to the mass balance so induced is provided.

In addition to the mass balance constraint which must be observed for proper gas turbine operation, the designed thermal constraints of the turbine must also be observed. The design of the turbine requires that the temperature of the combustion gases therein be closely matched to the designed operating temperature which, depending on the particular model of gas turbine utilized, ranges from about 1700° F. to 2050° F. Accordingly, the design of a gas turbine assumes that all air compressed in the compressor unit will be supplied to the energy production unit and that the $N_2$ and excess $O_2$ content thereof is available as cooling gases to moderate and control the temperature of the combusted fuel gas to the design temperature of the gas turbine.

The diversion of a substantial quantity of $O_2$ and $N_2$ from the energy production unit in the form of an oxygen enriched gas stream produced from the compressed air stream from the compressor unit, if not otherwise compensated for, will disrupt the mass and thermal balance design of the turbine. If not compensated for, then only small quantities of an oxygen enriched gas stream could be recovered without exceeding the mass balance safety tolerance of the gas turbine even if a proper combustion temperature is otherwise maintained.

This invention comprises a method and apparatus for recovering large quantities of an oxygen enriched gas from the volume of a compressed air stream produced by a gas turbine by compensation of the mass loss to the energy production unit section thereof by providing means for maintaining the turbine in proper mass and thermal balance as the turbine is utilized to provide the duty/power requirements of a process which utilizes the oxygen enriched gas stream as a reactant.

The oxygen enriched gas can be used for adiabatic reforming without a catalyst of hydrocabonaceous materials, starting from methane and ranging up to hydrocarbonaceous solid fuels like sub-bituminous or standard coal. In one embodiment of this invention the oxygen enriched gas stream is preferably utilized to adiabatically reform natural gas to a nitrogen containing raw synthesis gas which in turn is processed to convert a quantity of the CO and $H_2$ thereof into a normally liquid or waxy hydrocarbon product which is removed from the gas phase to yield a residual gas stream balance i.e., a tail gas, containing unreacted $H_2$, CO or a hydrocarbon and that quantity of $N_2$ which was introduced into the raw synthesis gas by the oxygen enriched gas utilized to adiabatically reform the natural gas. This tail gas is utilized as a fuel gas for operation of the energy production unit of the gas turbine as one means for maintaining a tolerable mass balance between the compressor and energy production units of the turbine since all nitrogen initially diverted from the compressor unit to energy production unit side thereof while producing the oxygen enriched gas mixture is returned to the energy production unit in the fuel gas therefor. In alternative embodiments of the inventive process, wherein the oxygen enriched gas stream is utilized for other types of processing which do not result in a tail gas stream suitable for use as a fuel gas or wherein the tail gas although of suitable heating value for fuel use has been depleted in its nitrogen content—such processing, for example, being the use of the oxygen enriched gas for more efficient operation of a Claus Unit or for production of a synthesis gas utilized in ammonia production—mass balance between the compressor and energy production units of the gas turbine is maintained by means of adding a non-combustible fluid such as low pressure stream to the energy production unit in an amount to balance against the amount of $O_2$ and $N_2$ lost to the energy production unit by such utilizations of the oxygen enriched gas stream.

In all embodiments, the excess power developed by the turbine over that required for production of the oxygen enriched gas stream is utilized to provide for the other duty requirements of the process, such as the operation of gas compressor or the generation of electrical energy.

The Oxygen Separation Unit

Figure 2:
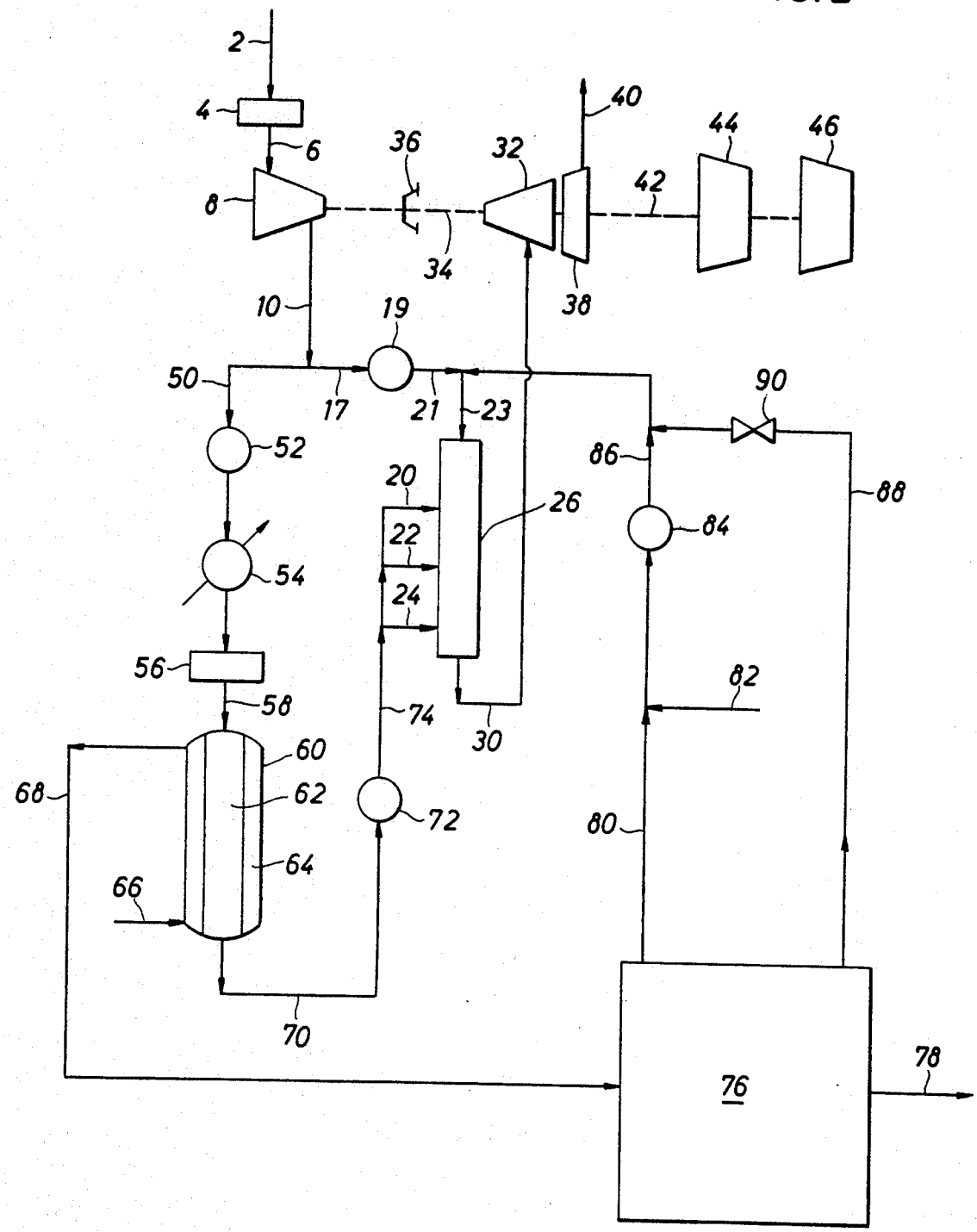
FIG. 2 schematically illustrates a unit design wherein a gas turbine supplies compressed air to an air separation unit for the production of a gas stream enriched in oxygen to a level greater 21 mole% $O_2$ and having at least about 40 mole % $N_2$. This oxygen enriched stream is preferably used to improve the efficiencies of an oxidization dependent process which produces a final overhead gas stream containing unreacted $H_2$, methane, possibly higher hydrocarbons, and possibly also CO, together with appreciable amounts $N_2$ which are returned to and utilized as a fuel gas and mass balance the gas turbine.

FIG. 2 schematically illustrates a unit design wherein a gas turbine supplies compressed air to an air separation unit for the production of an enriched oxygen stream, which can be used in a process. Air 2 is fed through a filter 4 and passed by line 6 to the air compressor 8 The compressed air in line 10 is split in stream 17 and stream 50. Stream 17 is fed via heat exchanger 19, which serves to balance the temperature to burner 26. From the process unit 76 wherein the oxygen enriched air 68 is utilized a tail gas stream is fed via line 80 to the burner 26. This stream can be augmented in methane content by addition of natural gas through line 82. The tail gas stream is warmed up to a desired level in heat-exchanger 84, and then fed via line 86 to the burner 26.

Stream 50 is heat-exchanged and further cooled in heat exchangers 52 and 54, after which it is filtered through a fine filter 56 before entering via line 58 into the diffusor unit 60. Two streams are generated here. Air enters the low pressure or permeate side 64 of the diffusor unit via line 66 and lowers the oxygen partial pressure in this sector, thus helping the diffusion of oxygen. This air stream moves preferentially countercurrently to the flow of the high pressure air, coming in via line 58 to the non-permeate side 62 of the diffusor. Stream 68 is obtained at low pressure, between 0.5 and 1 ata, and comprises an oxygen rich gas stream containing appreciable amounts of nitrogen. Stream 68 is fed to the process unit 76, where it is compressed before use. Compressors 44 and 46 which are operated by the turbine by mechanical linkage 42 can be used for compression duties in the operation of the process unit 76. The process 76 may also produce a low pressure steam by-product. Steam may be taken by line 88 and, if necessary, admitted by value 90 to mix with the tail gas in line 86. By this means if the tail gas 82 is of an insufficient mass to maintain the turbine with a proper mass imbalance tolerance, additional mass may be added to the tail gas in the form of low pressure steam to maintain a proper tolerance in the turbine. Stream 70 exits out of the diffusor at close to the inlet pressure in line 58. This stream is passed by line 70 through heat exchanger 72 and thereafter fed by line 74 to the combustor 26 via lines 20, 22 and 24 to effect cooling of the combustion gases to a designed temperature. Combustion gases are taken out of the burner through line 30 and fed to a first expander unit 32. In the first part of the expander the gas expands and cools. The energy, made available in this expansion, drives the expander blades around thus rotating shaft 34. This shaft drives compressor 8. Further, expansion of the hot gas takes place in a second sector of the expander 38, which further expansion produces power for compressors 44 and 46 through shaft 42. It is also possible to use the power generated for producing electricity. On the shaft between the air compressor 8 and the first expander 32 is a thrust bearing 36, which keeps the shaft in place against the larger thrust of the expander against the smaller thrust of the air compressor.

Preferably the diffusor unit 60 is a semi-permeable membrane separator. Any of a number of semi-permeable membranes may be used to effect oxygen enrichment, including organic polymer membranes and inorganic membranes. Organic polymer membranes include those formed of polycarbonates, polyesters, polyester carbonates, polysulfones, polyolefins, polyphenylene oxides, polyphenylene sulfides, polyethers, fluorinated polyamides, polystyrenes, polyetherketones, polyetherether ketones, polyetherimides, and polyamideimides. The membrane may further be a polysiloxene thin film such as that disclosed in Japanese Patent No. 59-51321, or an aromatic condensed ring polyamide such as those disclosed in U.S. Pat. No. 4,975,190, which disclosures are also incorporated by reference.

All membrane diffusor units 60 are protected by very fine filters to eliminate very small particles, which otherwise might clog the surface of the membranes. Of the possible organic polymer membranes, those that are suitable for use in the invention should withstand a pressure differential between the permeate and the non-permeated zones of 150 to 300 psig or greater within the temperature range of 100° and 150° F., without extension, compaction or collapse. In addition to the choice of polymerized material, factors which also contribute to the suitability of a membrane include the molecular weight of the polymer used and the manner in which the membrane is suspended. The membrane may be mounted in the diffusor unit in a plate-and-frame module, or a spiral-wound or capillary module, and the choice of mounting will in part determine the capability of the membrane to withstand a pressure differential between the non-permeate and the permeate zones. A capillary module is preferred because it provides a large membrane surface area and because the hollow fibers are resistant to distortion or rupture by the pressure differential across the membrane surface.

In an exemplary capillary module, the membrane is formed into many hollow fibers. Hollow fibers formed of a semipermeable membrane and having an inner diameter of between 0.01 and 0.1 microns are disclosed in U.S. Pat. No. 4,955,993, which is incorporated by reference. The fibers extend through a housing and through a gas impermeable barrier at each end of the housing. The fibers, barriers and housing define a permeate and a non-permeate zone. In a preferred mode, compressed air from the compressor is supplied to the inside all of the fibers and this interior constitutes the non-permeate zone whereas the area exterior to the fibers is the permeate zone. Oxygen diffuses preferentially to the nitrogen through the wall of the fibers and is collected in the permeate zone around the fibers. It is also possible to have the compressed air fed to the zone around the fibers which, in this case, would constitute the non-permeate zone, and collect the permeate inside the fibers. This last method can lead to use of higher pressures, but also calls for thicker fibers, which have a slower diffusion rate. In this last method oxygen in the air diffuses preferentially into the hollow of the fibers and passes through the barrier at one end via the fibers and is withdrawn into a permeate zone.

Where an organic membrane is used, it may be necessary to cool the heated compressed air from the gas turbine compressor before contacting the compressed air with the membrane surface. Heat exchangers such as 52 and 54 between the compressor 8 and the separator 60 may be used to cool the compressed gas.

Alternatively, a high temperature inorganic membrane may be used, such as, but not limited to, a silver composite membrane, a yttrium doped zirconium membrane or other solid oxide electrolyte membrane. Wherein an inorganic membrane is used, the heated compressed gas may be contacted with the membrane at elevated temperature.

The oxygen selective membranes known to the art typically have selective factors of five or more. When used to produce an oxygen enriched gas stream from air, the resultant oxygen enriched steam may have an oxygen content of up to 55 mole percent. Since under the preferred operating conditions, discussed below, the oxygen content of the oxygen enriched gas stream is between about 30 and about 40 mole percent, a diluting gas, preferably air, is provided to dilute the oxygen content to within the preferred range. It is preferred to produce an oxygen enriched gas stream which is of 35 mole % or less $O_2$. Gas streams richer in $O_2$ than 35 mole % generally require the use of compressors of special material construction for their safe compression which, if utilized, would add significantly to the capital cost of the equipment.

Preferably, air is introduced into the oxygen enriched permeate in the oxygen separator 60 via line 66 as stripper air. By diluting the oxygen enriched permeate at the surface of the semi-permeable membrane, the oxygen partial pressure gradient across the membrane is maximized, thereby providing a greater driving force for the separation of oxygen to the low pressure-permeate side of the membrane. Consequently, a membrane of a given surface area can permeate a greater quantity of oxygen at a faster rate than otherwise obtainable when dilution air is mixed with the enriched oxygen permeate away from the membrane surface.

When the exemplary hollow fiber module is used, the stripper air 66 is supplied to the permeate zone outside the fibers (assuming the compressed air is being fed to the insides of the fibers). The stripper air moves countercurrently to the high-pressure air flowing inside the fibers. The produced mixture of permeate and stripping air exits out of the permeate zone via line 68, which is located close to the inlet site 58 of the pressurized air.

In addition to oxygen content control, the dilution or stripper air 66 provides a means of controlling the nitrogen throughput of the process 76, which in turn provides a control means for the mass balance of the gas turbine by a return of this nitrogen to the turbine in the tail gas 80 as fuel to burner 26.

Oxygen removed from the compressed air of the turbine compressor by diffusion into the oxygen enriched permeate gas will ultimately be consumed by a chemical reaction and will not be returned to the energy production unit of the turbine in the tail gas fuel even though all co-diffused nitrogen is so returned. Stripper air 66 utilized to operate the membrane diffuser 60 more efficiently provides a means for replacing the mass loss due to oxygen diversion/consumption by replacing that mass loss with about an equivalent mass of nitrogen while providing a final oxygen enriched gas of the preferred oxygen concentration of 35 mole %. For instance, for an exact mass replacement, the membrane unit 60 may be operated to provide a permeate gas stream of 43.889 mole % $O_2$. For each 1000 SCFH of such permeate gas the addition thereto of 634.929 SCFH of air (21% $O_2$ and 79% $N_2$) provides as a final gas product 1634.929 SCFH of 35 mole % oxygen content, or 572.225 SCFH of oxygen. Of this amount 438.890 SCFH of oxygen is provided by the permeate gas whereas the stripper air has provided the additional oxygen together with 501.594 SCFH of nitrogen. The mass of this nitrogen (molecular weight of 28) leads to an equivalent oxygen mass (molecular weight of 32) of 438.894 SCFH of oxygen. For all practical purposes the added nitrogen is equal in mass to that of the oxygen in the permeate. The additional nitrogen passes as an inert through the subsequent processing unit 76 wherein the permeate oxygen is consumed and this additional nitrogen is ultimately returned in the tail gas fuel 80 to the combustor unit 26 of the turbine wherein its mass exactly compensates for that mass of oxygen lost to the permeate gas stream.

Adiabatic Reforming

Figure 3:
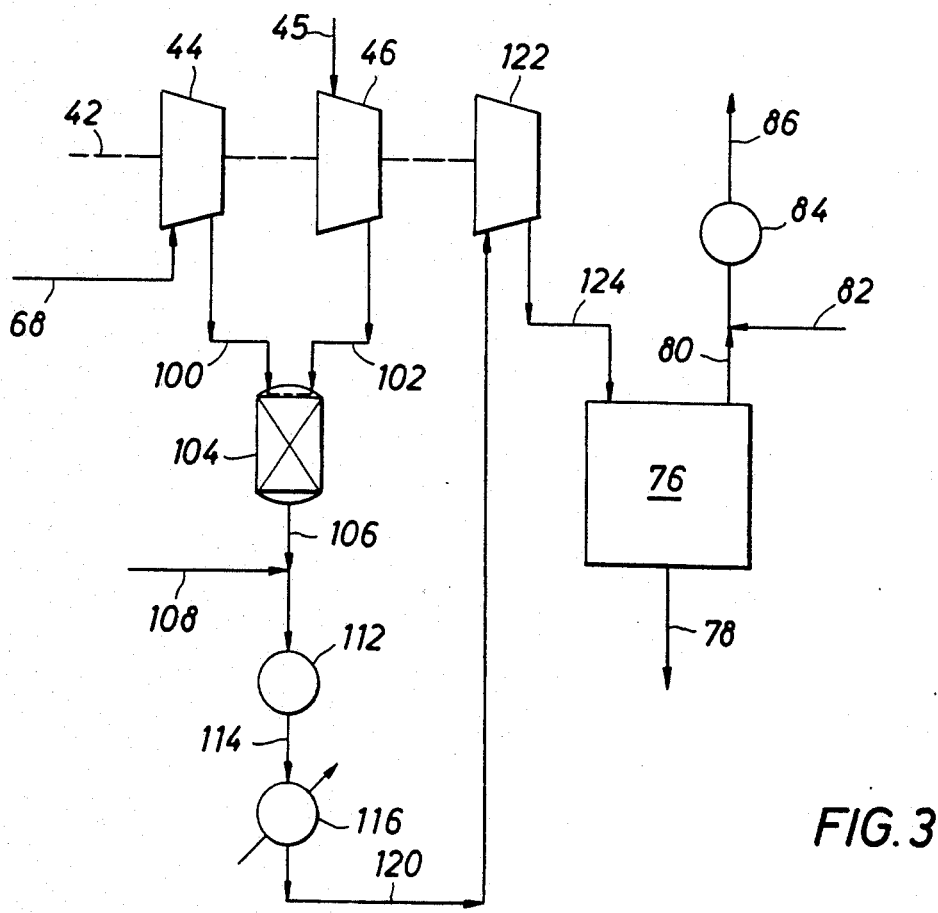
FIG. 3 schematically illustrates a unit design where the gas turbine is utilized to operate gas compressors by which an oxygen enriched gas stream as produced in FIG. 1 and a natural gas stream are compressed to the pressure required for adiabatic reaction to form a raw synthesis gas, the raw synthesis gas is then processed to recoverable products to leave a final overhead gas stream containing some reacted $H_2$, $CH_4$ or other hydrocarbons and $N_2$ which is returned to the gas turbine as fuel and mass balance.

FIG. 3 is a schematic continuation of FIG. 2. The oxygen rich gas stream 68, is compressed in compressor 44. It exits from that compressor via line 100. Natural gas stream is fed via line 45 to compressor 46, from which it exits through line 102. Streams 100 and 102 are combined in adiabatic reformer 104, where they react over a reforming catalyst to form a raw synthesis gas. Small amounts of steam and/or $CO_2$ may be added to the reactor. The raw synthesis gas leaves through line 106 and are cooled in heat exchangers 112 and 116. In FIG. 3 a third turbine driven compressor 122 is shown, which may provide additional compression, as needed, to the raw synthesis gas. In many cases this may not be necessary. Then the compressed synthesis gas enters a process unit 76. The process unit produces products, leaving via line 78 and a tail gas, leaving for the combustor 26 via line 80.

In the adiabatic reforming process of FIG. 3 natural gas is reacted with a quantity of gas which is enriched with oxygen relative to air to convert the hydrocarbon content of the natural gas to carbon monoxide, carbon dioxide, hydrogen and water wherein the molar ratio of hydrogen to carbon monoxide ($H_2/CO$) is between about 1.5 and about 1.9 and the molar ratio of carbon monoxide to carbon dioxide ($CO/CO_2$) is between about 10 and about 25. The raw synthesis gas stream resulting from this reaction, on a water free basis, comprises from about 15 to about 48 mole % nitrogen, from about 30 to about 50 mole % hydrogen, from about 18 to about 30 mole % carbon monoxide, and the balance being carbon dioxide, and a residual unreacted hydrocarbon content of less than about 5 mole %.

The raw synthesis gas stream 106 is then utilized in other processing steps 76 to produce various products 78 which are recovered to leave a tail gas 80 which is returned as fuel to the gas turbine combustor 26.

The oxygen enriched gas utilized to produce such reformed gas contains greater than about 21 mole % oxygen and at least about 40 mole % nitrogen. Such an oxygen enriched gas is adiabatically reacted with a carbonaceous material, like coal, heavy oil, naphtha or methane. When methane is used as carbonaceous material, the reaction can be carried out either in the absence or in the presence of a reforming catalyst to produce a reformed gas of a composition similar to the one given above. These gases are produced at a temperature of from about 1800° to about 2500° F. and a pressure of from about 300 to about 2000 psig. Preferably the adiabatic reaction of natural gas is accomplished by compressing the oxygen enriched gas to a pressure of from about 310 to about 2010 psig then heating the compressed oxygen enriched gas to a temperature of from about 700° to about 1400° F. and passing it into admixture with a natural gas stream which has the same pressure level and heated to a temperature of from about 800° to about 1050° F. order to avoid the need to use compressors of a special material construction, it is preferred to utilize an oxygen enriched gas wherein oxygen is present in an amount less than 35 mole %.

Wherein the so compressed and heated mixture of natural gas and oxygen enriched gas is adiabatically reacted in the absence of a catalyst, it is necessary that the natural gas and oxygen enriched gas be formed so that the produced reformed gas has a final temperature of from about 2100° to about 2500° F. At such conditions, an adiabatic reaction between the hydrocarbon content of the natural gas, and oxygen will occur in the absence of a catalyst to yield a reformed gas stream having the above mentioned final temperature and a pressure of from about 1 to about 10 psi lower than that of the unreacted intake gas. Wherein the adiabatic reaction is performed in the presence of a reforming catalyst, the natural gas and oxygen enriched gas may be formed so that the produced reformed gas has an outlet temperature of from about 1800 to about 2200° F. and a pressure of from about 100 to about 2000 psig.

For the embodiment of this process which uses a reforming catalyst in the formation of a reformed gas, the catalyst composition may be any of the well known reforming catalysts, compositions as, for instance, described in *Petrochemical Handbook '89, Hydrocarbon Processing*, November 1989, page 106, which is incorporated herein by reference.

The quantity of the oxygen for reaction with the natural gas must be selected such that on reaction, after contact with a reforming catalyst or with sufficient residence time at reaction temperature without a reforming catalyst, the reformed gas reaches the desired final temperature of between 1800 and 2500° F. On the basis of hydrocarbon carbon content of the natural gas, the CO and $CO_2$ content of the reformed gas is more than 80 mole %, preferably more than 90% CO. Between 1 and 15 mole % of the original hydrocarbon carbon atoms of the natural gas stream are present in the reformed gas as methane. In addition, the reformed gas will have a substantial amount of nitrogen originating from the oxygen enriched gas stream. An additional product of the reforming process is water. The process significant reactants and products of the adiabatic reforming step may be represented in the following manner, it being understood by one of ordinary skill that the stoichiometric relationships are not expressed and where parentheses indicate wholly or partially unreacted components:

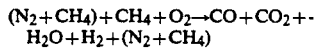

$(N_2+CH_4)+CH_4+O_2 \rightarrow CO+CO_2+H_2O+H_2+(N_2+CH_4)$

The reformed product is thus a raw synthesis gas whose primary components are carbon monoxide and hydrogen, but which also typically contains some $CO_2$, wherein the raw synthesis gas is comixed with water vapor, nitrogen and unreacted methane. When no steam or $CO_2$ have been added to the reaction, the reformed gas stream contains $H_2$ in a molar ratio with respect to CO of from about 1.5 to about 1.9 and CO is present in a molar ratio with respect to $CO_2$ of from about 10 to about 25.

Process Utilization of the Nitrogen Containing Synthesis Gas

To render the raw synthesis gas suitable for commercial production of liquid hydrocarbons by an MTG process, the raw synthesis gas must first be dewatered. The gas is cooled to a temperature of from about 100° to about 140° F. to condense and remove water therefrom. At a temperature of about 100° F., the final vapor pressure of water is about 0.95 psia, at a temperature of about 140° F. the final water vapor pressure is about 2.89 psia. Depending on the pressure, cooling to 140° F. will remove from the raw synthesis gas most of the water produced in the reforming reaction.

The so refined synthesis gas may be used for the production of liquid hydrocarbons by converting the synthesis gas to methanol or a methanol-dimethylether mixture with subsequent conversion of the methanol or methanol-ether mixture to high molecular weight hydrocarbons using process pioneered by Mobil Oil Corp. and described in U.S. Pat. Nos. 4,044,061 and 4,058,576.

To produce the starting material for the methanol to gasoline conversion process ("MTG"), the dewatered or refined synthesis gas is reheated to a temperature of from about 435° to about 500° F. and passed into contact with a catalyst composition which promotes reaction between hydrogen and carbon monoxide to produce methoxy compounds, particularly methanol and/or dimethyl ether or combinations thereof. Catalysts suitable for such reaction are well known. Examples of such catalysts compositions are described in U.S. Pat. No. 4,520,216, which discusses both the catalyst to make methanol only and catalyst mixtures for coproduction of methanol in admixture with DME. This patent is hereby incorporated by reference.

Preferably, the refined synthesis gas is contacted with such methoxy compound production catalysts at a pressure of from about 390 to about 1990 psig. Accordingly, wherein the methoxy catalyst composition is one for production of methanol only, it is preferred to initially produce the raw synthesis gas under conditions wherein the resulting synthesis gas has a pressure of from about 600 to about 1990 psig. This manner of producing the synthesis gas eliminates the need to recompress it to the pressure required for the most efficient conversion of the synthesis gas to methanol by contact with the catalyst. Wherein the catalyst composition is one which promotes the co-production of methanol and dimethyl ether, the synthesis gas may be reacted at a pressure of from about 560 to about 1500 psig. At such lower pressures, the conversion of the synthesis gas carbon content to methanol and dimethyl ether is still efficient even though the pressure is significantly lower. Wherein the synthesis gas is initially produced to a pressure of from about 100 to about 2000 psig, it is preferred to contact it with a methanol/DME catalysts since for such contact, the synthesis gas requires only a moderate degree of recompression before contact and, accordingly, both the size and cost of the required compressor for such operation is lower.

Methanol Production

One embodiment of the method of this invention contemplates the recovery of the hydrocarbon content of a natural gas in the form of crude methanol only. Since methanol is a liquid, it may be conveniently stored and transported to an offsite location for subsequent processing, such as refining into market grade methanol, for use in manufacturing methyl ethers or for use as the feed stream to an offsite methanol to olefin or gasoline process.

The preferred method for recovering methanol only from a synthesis gas made in accordance with this invention is described in commonly owned copending U.S. patent application Ser. No. 508,928, which is hereby incorporated by reference. With reference to FIG. 3 of that application, it is also possible to react the final gas after reaction in the third methanol reactor described in Ser. No. 508,928 and after removal of most of the methanol made by cooling, over a mixed methanolacidic catalyst to promote the formation of DME. This DME, together with small amounts of methanol formed, can be extracted with water and converted in the presence of $CO_2$ and steam into a small amount of synthesis gas, that is a mixture of CO and hydrogen, plus extra $CO_2$. This synthesis gas, made by recycle, is added to the gas, fed to the first methanol reactor. Thus a considerably higher methanol yield can be attained, notwithstanding the relatively low partial pressures of the reactants.

Fuel Production

Methanol to Gasoline

Another embodiment of the invention contemplates the production of gasoline from a methanol-DME mixture and this intended use determines the conditions most preferred for the synthesis gas production.

Figure 4:
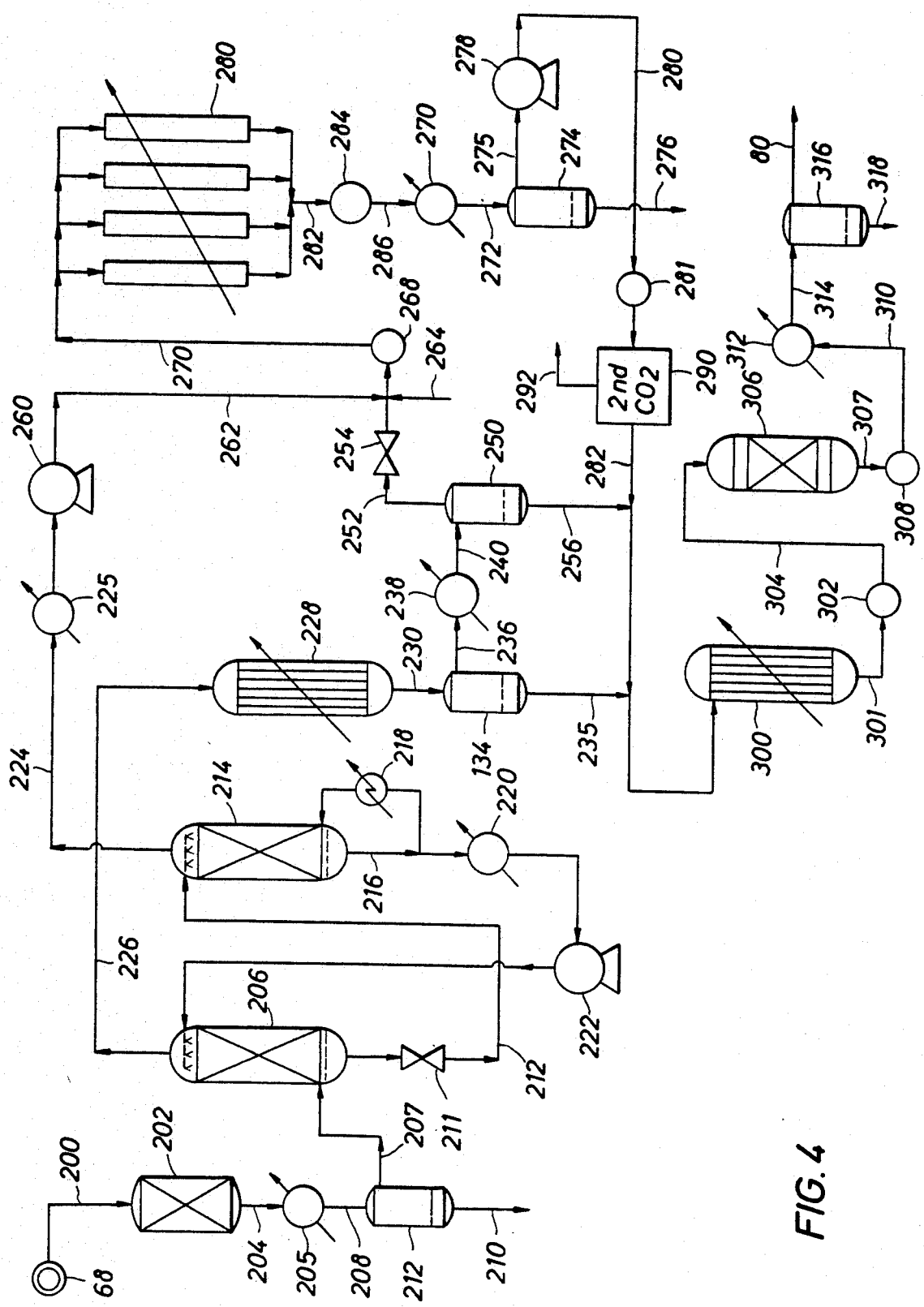
FIG. 4 schematically illustrates a unit design wherein a nitrogen containing synthesis gas as produced by the unit of FIG. 2 may be processed by a Fischer-Tropsch technique to a waxy hydrocarbon intermediate product which may then be hydrofined to a high grade diesel fuel liquid hydrocarbon product. A final overhead gas stream containing methane and $N_2$ is returned to the gas turbine as fuel and mass balance.

The method most preferred for gasoline production from a synthesis gas made in accordance with this invention is described with particular reference to FIG. 4 of commonly owned U.S. patent application Ser. No. 508,928 which is incorporated by reference.

Once again, utilization of the process tail gas as fuel for the gas turbine returns it to a proper mass balance by returning to the energy production unit thereof all nitrogen which was initially diverted into the $O_2$ enriched gas stream. This means by itself enables the production of an $O_2$ enriched gas stream in greater volume than otherwise would allow compliance with the mass balance constraints of the gas turbine. Further, as described with reference to FIG. 2, since in the preferred mode stripper air 66 is added in an amount to dilute the $O_2$ enriched permeate to an $O_2$ level of not greater than about 35 mole % $O_2$, a further quantity of both $O_2$ and $N_2$ are obtained in the $O_2$ enriched stream 68 with the so added $N_2$ being returned in the tail gas 80 to the turbine. This further increases the amount of permeate $O_2$ which can be produced without violating the mass balance constraints of the turbine.

Although the preferred embodiments of the process have been described with reference to the production of crude methanol only and with regard to methanol and gasoline, the process is not so limited. Other molecular sieve catalyst compositions, as described in U.S. Pat. No. 4,788,369 may be employed in place of a MTG catalyst for the production of other desirable compositions from methanol and/or DME, like for instance that proposed in U.S. Pat. No. 4,654,453 wherein excess isobutane produced in the MTG process is reacted with olefins made in the MTG process. This more complicated scheme has merit from the standpoint of octane improvement.

Fischer-Tropsch/Hydrofining Fuel Production

Another embodiment of this process, as illustrated in FIG. 4, utilizes the raw synthesis for the production of diesel grade liquid hydrocarbon by reacting it under Fischer-Tropsch conditions to a waxy hydrocarbon which is then hydrocracked to a diesel grade liquid hydrocarbon.

In this embodiment the raw synthesis gas is first reacted under water-gas shift reaction conditions until a quantity of its CO and $H_2O$ content has reacted to $CO_2$ and $H_2$ to provide a shifted synthesis gas having a ratio of $H_2$ to CO of from about 1.85 to about 2.2, most preferably about 2.1:1. The shifted synthesis gas can then be contacted with a medium selective for the absorption of $CO_2$ and its $CO_2$ content may be reduced to about 1 mole %.

FIG. 4 schematically illustrates a unit design wherein a nitrogen containing synthesis gas as produced by the unit illustrated by FIG. 2, after compression, is fed by line 200 into unit 202 where a small watergas shift is achieved. The gas exits via line 204, is cooled in heat exchanger 205 and then the gas and condensed liquid are fed via line 208 into separator 212. Condensed liquid is separated and taken off via line 210. The gas moves via line 207 to $CO_2$ absorber 206, where the gas is contacted with a standard carbon dioxide absorber liquid, like for instance an amine. The fat solution is separated at the bottom and via valve 211 and line 212 fed into stripper 214. There $CO_2$ is removed by the input of heat at the bottom (heat exchanger 218) and leaves the stripper in line 224. The stripped liquid is cooled and recycled to the absorber via line 216, cooler 220 and pump 222. The gas with a much lower $CO_2$ content exits from the absorber via line 226 and is fed to the first Fischer-Tropsch reactor 228. Heavy and waxy products are separated hot in separator 236, as stream 235, while lower hydrocarbons are obtained as liquids by cooling in heat-exchanger 238 and separated in separator 250. These liquids are taken away via line 256. The remaining gas is reduced to an intermediate pressure and combined via line 252 and valve 254 with the earlier separated $CO_2$ after that gas has been cooled in heat-exchanger 225 and compressed in compressor 260. Also steam is added via line 264. The combined stream is heated in heat exchanger 268 and fed via line 270 to heat-exchanged reformer 280, which is heated by the hot gas coming out of the adiabatic reformer (unit 104 of FIG. 3), which produced the first synthesis gas. All the reformed gas from unit 280 is combined into line 282, is heat exchanged and cooled in heat exchangers 284 and 270 and fed via line 272 into separator 274. There an aqueous condensate is removed via line 276. The gas is taken from the separator by line 275 and compressed in compressor 278, and via line 280 heated in heat exchanger 281 then contacted with a standard carbon dioxide absorber liquid in a second $CO_2$ absorber unit 290. The gas from which $CO_2$ has been removed is the taken by line 282 and fed into the second Fischer-Tropsch reactor 300, after the products of the first stage Fischer-Tropsch reaction have been added to this gas via lines 235 and 256. After this second reaction the gas and liquid mixture is taken via line 301 warmed up in heat exchanger 302 and fed by line 304 to hydrogenator 306. There the waxy products are hydrogenated into lower boiling and commercially more attractive hydrocarbon streams, like Diesel and kerosene. The exit stream from reactor 306 is fed via line 307 to heat exchangers 308 and 312, which cool the gas down. Condensates are removed in separator 316 and fed by line 318 to a distillation sector for final splitting. With reference to FIGS. 2 and 4, the remaining gas stream is fed out of separator 316 via line 80 to the burner 26 of the gas turbine after addition of some natural gas by line 82 to augment the fuel value of the gas.

Other Process Uses for Products

Yet another embodiment of this invention contemplates the use of the $O_2$ enriched gas stream for the production of non-hydrocarbon products, such as ammonia, or for increasing the efficiencies of oxidation based processes, such as the Claus process. In many Claus processes a gas turbine is already present for the purposes of power, mechanical or electrical generation. As before described, with reference to FIG. 2, an oxygen separation unit, such as a semi-permeable membrane unit, may be incorporated into the compressed air line between the compressor and energy production units of the turbine and an $O_2$ enriched gas stream may be produced with the $O_2$ depleted gas stream being returned to the energy production unit of the turbine.

The $O_2$ enriched gas stream thereby produced can be utilized as the oxidizing gas in the Claus process to increase the throughput capacity of the plant and reduce plant emissions. In this event, a tail gas suitable for use as turbine fuel is not produced and consequently the mass of nitrogen diverted from the energy production unit of the turbine as a part of the $O_2$ enriched gas stream is not returned to the turbine. In this circumstance, as shown in FIG. 2, the means for returning the turbine to a proper mass balance comprises the addition of low pressure steam by line 88 to the energy production unit of the turbine in an amount necessary to insure a mass imbalance of no greater than 10%. Low pressure steam is invariably available as a byproduct of the Claus process.

In another embodiment, the $O_2$ enriched gas stream is utilized to produce a high $N_2$ content synthesis gas which may be utilized to produce ammonia. In this circumstance, the nitrogen content of the gas stream is consumed in the production of ammonia. Accordingly, that quantity of $N_2$ initially diverted from the energy production unit is substantially depleted by its conversion to ammonia and is not returned to the energy production unit as part of the tail gas fuel. Again, a means for restoring the turbine to a tolerable mass balance is to add low pressure steam or other non-combustible fluid to the energy production unit. Again low pressure steam is almost always available as a byproduct in an ammonia production process.

Means For Maintaining Turbine Mass and Thermal Balance

In whatever overall process the gas turbine-oxygen separation unit may be incorporated for the purposes of power generation and production of an $O_2$ enriched gas stream as a process reactant, the mass and thermal balance of the turbine must be maintained within tolerances. One way for achieving such maintenance is by limiting the quantities of the $O_2$ enriched gas stream taken to such minor amounts as to lack any substantial utility to an industrial scale process. To increase the quantities of an $O_2$ enriched gas stream that may be produced to amounts which have industrial scale utility, means for matching the mass-thermal balance of the turbine as a function of the quantity of $O_2$ enriched gas stream produced, must be provided.

As described, this invention provides means for maintaining a gas turbine in proper mass-thermal balance while producing large quantities of an $O_2$ enriched gas at significantly reduced cost, both capital and operating, for the amounts of $O_2$ so produced. One embodiment of such means comprises the utilization of such $O_2$ enriched gas to produce a synthesis gas containing at least that quantity of $N_2$ diverted from the turbine compressed air which is integrated with a process that converts such synthesis gas to recoverable hydrocarbon products and a tail gas and use of such tail gas as fuel for said turbine to thereby return to the energy production unit of the turbine all $N_2$ initially diverted therefrom. Such means increases the quantity of $O_2$ which can be produced by returning to the turbine all nitrogen initially co-diverted.

Another means comprises the addition of diluent air to the $O_2$ enriched permeate gas stream to result in a product stream of not greater than 35 mole % $O_2$, the dilute air so added adding both additional $O_2$ and additional $N_2$, increasing both the total quantity of $O_2$ possible to permeate and total resultant $O_2$ available as well as the total quantity of $N_2$ in the resulting $O_2$ enriched gas stream, utilization of this gas stream to form a synthesis gas which is then converted to a recoverable hydrocarbon product and a tail gas stream and use of such tail gas stream as fuel for the energy production unit of the turbine to thereby return to such unit the total quantity of $N_2$ imparted to the synthesis gas. This means provides for a return to the energy production unit of the turbine all $N_2$ diverted from the turbine compressed air and an additional $N_2$ quantity added by the diluent air. Accordingly, the quantity of $O_2$ which can be separated from the turbine compressed air is increased by the amount of $N_2$ added by diluent air without violating the mass balance constraints of the gas turbine design.

In another embodiment, the means for conforming to the mass balance constraints of the gas turbine to conform with the large quantity of $O_2$ enriched gas produced comprises the addition to the energy production unit thereof of a compensating mass of a non-combustible fluid, such as $CO_2$ or low pressure stream equal to the mass of $O_2$ and $N_2$ diverted from the energy production unit in the form of the $O_2$ enriched gas stream so produced and utilized in a process without provision for return of any part thereof to the energy production unit as fuel or otherwise.

THE EXAMPLES

The Examples which follow demonstrate, but are not limiting of, the invention herein described. In each example, unless otherwise stated, MPH means lb-moles per hour and SCFH means the cubic feet of a gas per hour measured on the basis of 760 mm Hg and 0° C. MTPD means metric tons per day. Although the actual composition of air is about 21 mole % $O_2$, 78 mole % $N_2$, and 1 mole % other gases; Air, for purposes of the examples, assumes a mixture of 21 mole % $O_2$ and 79 mole % $N_2$. Unless otherwise indicated, for purposes of the examples, it is assumed that the oxygen separation device comprises a semi-permeable membrane which is selective to the permeation of $O_2$ over $N_2$ to a gas permeation factor of about 5.6.

EXAMPLES

Example 1 (Comparative)

A standard membrane diffusor unit for enriched air uses 6200 SCFH of air. This air is compressed to 8 atmospheres gauge or 9 atmospheres absolute and then fed to the diffusion unit. There 2600 SCFH of a permeate gas is produced at atmospheric pressure which contains 40 mole % of oxygen. The non-permeate gas has an oxygen content of 7.278%. The purity of oxygen reached in the diffused or permeate gas corresponds to approximately an enrichment factor of oxygen over nitrogen of 5.6. If it is desired to use 35% oxygen content gas, 928.6 SCFH air are added to the permeate gas stream in order to obtain 3528.6 SCFH 35% oxygen.

Example 2

This example illustrates the gain in production of oxygen-rich gas out of a diffusor by feeding the diffusor with compressed air, when such air feed can be used in larger amounts than in Example 1, due to its "free" availability. The gain in diffusor effectivity is obtained notwithstanding the somewhat lower pressure of the compressed air, following the 8 to 1 compression ratio of the gas turbine used. The amount of oxygen and nitrogen diffused out of the compressed air is limited to a total, which will only slightly disturb the mass balance around the gas turbine. In this example a Frame-5 General Electric gas turbine generates about 36000 BHP on its shaft by feeding it with a fuel gas stream having the equivalent heating value of 884.4 MPH methane. For the fuel supplied this turbine compresses 33691 MPH air to 8 atmospheres absolute (ATA) in the compressor unit of the gas turbine. This amount of air contains 4 times the amount of oxygen necessary to completely oxidize the methane fed. Of the compressed air 9265 MPH, or about 10% excess over stoichiometry for complete fuel combustion, is directly fed back to the burner, to which the methane is fed. The rest of the compressed air, 24426 MPH, cooled to a temperature of 100° F. and then fed to 564 diffusor units, each containing the same total membrane surface area as the unit of Example 1. Due to the larger air flow at the lower pressure it is preferred to have a shorter pass for the high-pressure non-permeate gas, keeping the total surface area the same. The exit high-pressure gas, or "spent air," amounts for each diffusion unit to 13882 SCFH, containing 16.0% oxygen. Each diffusor produces 2531.3 SCFH of an oxygen-rich permeate gas with an oxygen content of 48.42%. For the 564 diffusor units this corresponds to about 456 MTPD equialent pure oxygen.

The oxygen-rich permeate gas is diluted with air to a total of 4957.7 SCFH of a 35% oxygen gas mixture per each diffusion unit, which is a substantial increase of the amount prepared with a comparable diffusor unit under Example 1. All the 35% oxygen streams are combined and used in processes as discussed in the text. The gas turbine remains driven by natural gas. Notwithstanding the seemingly small amount of diffused product, the mass balance indicates a shortage of 1451.7 lb./hr. in the energy producting unit, more than the allowable 10% difference with a reversed thrust bearing. This amount of weight is made up by the same amount of weight of steam, which is fed to the turbine at 10 ata. Alternatively, a greater amount of steam could be added to provide for a greater mass flow in the energy production unit than in the air compressor unit, in which event the thrust bearing need not be reversed.

Example 3

The same gas turbine as in Example 2 likewise supplies 9265 MPH of compressed air to the flame and the rest, 24426 MPH of compressed air, is fed to 462 diffusional units, each with the same diffusional area as in the earlier Examples. Each unit therefore is fed with approximately 20038 SCFH of compressed air. 3160 SCFH of 1 ata air is used to strip the diffused product out. Obtained are 5861.4 SCFH, containing 35.79% of oxygen. Diluting this with some more air results in 6192.3 SCFH of 35% air. This number is still substantially higher than in Example 2. Total equivalent oxygen production is 467 MTPD, which signifies a substantial increase in equivalent oxygen produced per diffusion unit.

Because of the relative improvement in the oxygen diffusion, thanks to the stripping air, the mass balance now is only 8.75% off, so that no steam needs to be injected, after the reversal of the thrust bearing. Alternatively, the thrust bearing need not be reversed if steam is added in an amount to provide for a greater mass flow in the energy prodution unit than there is in the air compressor unit.

Example 4

In this example the air feed pressure is increased to 11.2 ATA by compressing the cooled air out of the gas turbine and after compression cooling the gas back down. Now only 287 membrane diffusor units are used, each with the same membrane surface area as in the earlier Examples, but with substantially shorter fiber lengths. Each unit now receives a total of 32256 SCFH of compressed air. Spent air at 28422.5 SCFH per unit, contains 16.92% oxygen. The product stream per unit, is 3833.5 SCFH, containing 51.26% oxygen. Now the total equivalent oxygen is 388 MTPD.

By dilution with air 8285.8 SCFH of a 35% oxygen stream is obtained per unit. Steam is added after reversal of the thrust bearing to bring mass balance within 10%.

Example 5

A similar run as in Example 4 but operated at about 0.5 ATA lower pressures, both on the non-permeate side as on the permeate side of each diffusor unit produces an oxygen concentration in the product stream of 53.74%.

Similar improvements as shown in these Examples can be obtained with diffusion materials which have different enrichment factors for oxygen over nitrogen.

Example 6

In this Example a gas turbine is fed by a tail gas stream of a methanol process, containing 1516 MPH CO, 2126 MPH $H_2$, 100 MPH $CO_2$, 550 MPH $CH_4$, 11766 MPH $N_2$ and small amounts of water. The total fuel value of this gas stream corresponds to that in 1725.86 MPH methane, which leads in a 3/1 turbine to a total compressed oxygen volume of 10355 MPH and a compressed air volume of 49310 MPH. These lower air excess turbines are of higher efficiency. They operate at 12/1 or 16/1 air compression ratio. The fuel value of the tail gas is 97.66 BTU/SCF.

Out of the total amount of compressed air 32950 MPH are fed to a diffusor complex after compression of the gas to 13 ATA. Stripper air is used to an amount of 9184 MPH. Obtained are 17570 MPH of 34.74% oxygen content, which stream is used in the methanol production process after compression from its level of 1 ATA to 87 ATA. Diffusion is economical, in that the production of oxygen equivalent is 2.59 times faster than in the standard preparation of 40% oxygen as per comparative Example 1. This comparison is based on the determination of the comparable amount of 34.7% oxygen-rich gas, which amount is obtained by mixing in air with the richer oxygen-containing stream. The total equivalent oxygen is 1066.8 MTPD.

The feed gas to the reformer reactor, containing 9100 MPH methane, 500 MPH ethane, 300 MPH $CO_2$, and 300 MPH nitrogen, is also compressed to this pressure. The two gases are mixed after individual preheats and reacted in a reformer over reforming catalyst to provide a raw synthesis gas at a final temperature of 2100 degrees Fahrenheit.

After cooling and removal of water the refined synthesis gas is reacted in sequence in three methanol reactors with intermediate removal of methanol. Then the remaining gas is fed to a reactor filled with a mixture of a methanol catalyst and a simple acidic one, like alumina. In this manner conversion of methanol formed to dimethyl ether (DME) is catalyzed. This DME formation allows a much larger conversion of the synthesis gas.

Now DME and methanol are absorbed out leaving a tail gas stream which is fed to the gas turbine as fuel. After regasification of the DME and methanol which has been absorbed out of steam and $CO_2$ are added to this gas mixture the gases are reformed at modest temperatures to a mixture, comprising CO and hydrogen. This reformed gas mixture is added to the raw synthesis gas made by adiabatic reforming. Balance around the gas turbine.

Air used is 1,422,100 lb./Hr.

Gas fed to the diffusor is 950,278 lb/Hr.

Back to the gas turbine is "spent air", weight 698,769 lb/Hr.

Loss in these two streams is 251,509 lb/Hr.

Final bleed gas weight is 389,348 lb/Hr.

Total leads to a total weight of $$1422100 - 251509 + 389348 = 1559949 \ lb/Hr.$$

Ratio of mass is 1.097, which is less than the 10% mass balance limitation within the turbine must be operated.

For combustion of the tail gas is needed $(1516 + 2126 + 4 \times 550) = 5842$ pound atoms oxygen, or 2921 MPH. This corresponds to 13910 MPH air. Available are 16360 MPH air for combustion, which is more than sufficient.

Example 7

This Example addresses the use of the diffusor in combination with a gas turbine for use in a Fischer-Tropsch process.

The gas turbine is fed with a tail gas to which, extra methane is added to arrive at a composition comprising 1325 MPH $CH_4$ and 11141 MPH Nitrogen. This gas has a combustion value of 96.6 BTU/scf. The gas turbine is of the 4/1 compression variety. The total volume of compressed air provided by the turbine compressor is 50476 MPH.

Of this air stream 35380 MPH are fed after cooling to a temperature not exceeding 110° F. to a diffusor unit after compression to 9 ATA. 9957 MPH air are used as diffusor stripper air at 0.7 ATA. Obtained from the permeate side of the diffusor are 16260 MPH of an oxygen-nitrogen mixture containing 33.33% oxygen. The comparative production rate is now 2.007 times the standard rate. Total equivalent oxygen produced is 885.9 MTPD.

This oxygen enriched gas stream is compressed and used in a Fischer-Tropsch process.

First the gas stream is contacted after preheat to 800° F. with a natural gas stream, containing 9100 MPH methane, 500 MPH ethane, 300 MPH $CO_2$ and 300 MPH nitrogen. The reaction is catalyzed by a high-temperature reforming catalyst. Pressure of the reforming operation is 32.3 ATA. The hot raw synthesis gas composition is 8910 MPH CO, 16090 MPH hydrogen, 490 MPH $CO_2$, 1610 MPH water, 1000 MPH methane, and 11141 MPH nitrogen.

This raw synthesis gas is cooled and subjected to some watergas shift to effect a watergas shift of 500 MPH CO with water to 500 MPH $CO_2$ and 500 MPH hydrogen. The shifted synthesis gas is cooled, water is removed, and then the shifted synthesis gas is contacted with a $CO_2$ absorber fluid.

After removal of the $CO_2$ the synthesis gas is compressed to 57 ATA and contacted with a Fischer-Tropsch catalyst. The catalyst is chosen so as to generate a large fraction of a waxy hydrocarbon product. Produucts are removed first hot, then by cooling. The contact with a Fischer-Tropsch catayst is repeated, followed by a second recovery. After separation of waxy product the remaining gas is dropped in pressure and reformed over a reforming catalyst after addition of the extracted $CO_2$ and of steam. This reforming can take place at least partly in heat-exchange with the hot gases out of the adiabatic reformer step, as the pressure of operation is essentially the same, namely 32 83 ATA.

After cooling, watergas shift and further cooling the $CO_2$ is removed and the remaining gas now contains 2045 MPH CO, 4895 MPH $H_2$, 11141 MPH nitrogen, and traces of water. This gas is compressed to 57 ATA and fed to a second stage of reheated contact with a catalyst to produce a second quantity of a waxy hydrocarbon product Fischer-Tropsch.

After the Fischer-Tropsch reaction the first waxy product is added to this reaction gas stream and the combined stream is contacted with a hydrogenation catalyst in order to convert the waxy fraction into lower boiling products like diesel and kerosene. After final removal of the products the remaining bleed gas stream contains only 840 MPH methane and that amount of $N_2$ which was originally present in the raw synthesis gas. 485 MPH methane are added in order to arrive at sufficient fuel for the gas turbine, this in order to drive the different compressors in the process.

This final tail gas is fed to the gas turbine. Gas Turbine Balance:

Air to Compressor $$50480 \times 28.84 = 1,455,728 \ lb./Hr.$$

Total Product Out of Diffusor $$\tfrac{1}{3} \times 16260 \times 32 + \tfrac{2}{3} \times 16260 \times 28 = 476,960 \ lb./Hr.$$

Stripping air to Diffusor $$9957 \times 28.84 = \frac{287,160}{189,800} \ \substack{lb./Hr. \\ lb./Hr.}$$
Diffused $O_2/N_2$ Fuel Mass $$1325 \times 16 + 11141 \times 28 = 333,148 \ lb./Hr.$$

Mass Increase Therefore 143,348 lb./Hr. or 9.85% of flow to compressor.

Example 8

This Example shows how the gas turbine - diffusor combination might be used in an ammonia process. As the adiabatic reforming process leads to a relatively high nitrogen content, the only possible ammonia processing is based on use of low hydrogen to nitrogen operation. Catalysts have to be used, that can make this acceptable. The ruthenium-based catalysts can operate under such conditions.

The gas turbine is fed with a bleed gas out of the ammonia process. It contains 4912 MPH hydrogen, 4954 MPH nitrogen, and 399 MPH methane, next to small amounts of argon. This gas has a combustion lower heat value of 649.4 MM BTU/Hr. and a specific heating value of 167 BTU/SCF.

The gas turbine is on a 3 air excess basis, compressing the air to 12 ATA. The total air stream is 53625 MPH. After compression 33070 MPH air are fed to the diffusor unit. There 8550 MPH air are used to strip. The product of diffusion is a stream of 17850 MPH oxygen-nitrogen mixture with 34.71% oxygen, representing an oxygen equivalent of 1081 MTPD. This stream is produced at a rate per surface area which is 2.13 times the rate that a standard diffusor using compressed air to 9 ATA will produce, using the same membrane quality. The reason for the improved rates result from the higher oxygen concentration left remaining in the non-permeate gas stream (10.7% as against the standard of 7.28% commonly used) and the use of stripper air in the permeate zone of the diffusor, this combined with the slightly higher pressure of operation. The partial pressure of oxygen in the spent air is 1.25 ATA.

The oxygen-rich stream is compressed to 36 ATA, preheated to 800° F. and reacted with a natural gas stream, consisting of 9100 MPH methane, 500 MPH ethane, 300 MPH nitrogen and 300 MPH carbon dioxide, preheated to 1050° F. A reforming catalyst is used to achieve proper reaction. The final temperature is 2100° F. and the pressure is 34.95 ATA.

The gas is quenched with condensate, more steam is added to a total of 25000 MPH. High and low temperature watergas shift contacts are taken, resulting in a gas stream containing 129 MPH CO. After cooling and removal of condensate, $CO_2$ is removed by extraction. The remaining gas is subjected to methanation. All these steps are common in processing of raw synthesis gas for use in ammonia manufacture.

After cooling and removal of the remaining water the gas composition is 25912 MPH $H_2$, 11954 MPH $N_2$, and 399 methane, and traces of argon.

This gas is fed to a standard ammonia loop, containing, however, a modern catalyst, like ruthenium on carbon. The tail gas out of the loop contains 4912 MPH $H_2$, 4954 $N_2$, 399 MPH methane and traces of argon. This tail gas stream is fed back to the gas turbine. The process makes 14000 MPH of ammonia.

The oxygen process is an example for a very low-cost ammonia plant with a somewhat higher than usual consumption of natural gas.

If desired, some steam reforming with indirect heat input can be driven by the heat from the adiabatic reforming. Then at somewhat higher capital cost a low consumption of natural gas is encountered.

Gas Turbine Balance:
Air to compressor $$53625 \times 28.84 = 1,546,545 \; lb./Hr.$$

Total product out of diffusor $$1785 \times 0.3471 \times 32 + 17850 \times 0.6529 \times 28 = 524,583 \; lb./Hr.$$

Stripping Air to Diffusor $$8550 \times 28.84 = \underline{246,582} \; lb./Hr,$$
$$\text{Diffused } O_2/N_2 = \phantom{xx} 278,001 \; lb./Hr.$$

Fuel mass $$4912 \times 2 + 4954 \times 28 + 399 \times 16 = \underline{154,920} \; lb./Hr.$$
$$\text{Less} = \phantom{xx} 123,081 \; lb./Hr.$$

This is 7.96% of air mass flow to compressor. This is allowable with a reversal of the thrust bearing.

Example 9

This Example shows how the diffusor can be added to a gas turbine dedicated to generate horsepower, for example in generating electricity. The thus generated rich oxygen-nitrogen mixture can be used for many purposes. For instance, it can be used in general in many combustion process, thus because of its lower nitrogen content the amount of stackgas is diminished. In this Example it is assumed it is used to replace air feed in a Claus process. This is a variation of the well-known proposal to replace air by oxygen in an existing Claus unit in order to increase production rate and/or lessen the sulfur dioxide output. Most of the possible reduction in nitrogen content of the effluent of the Claus unit is obtainable by using a rich oxygen-nitrogen mixture.

A gas turbine is fed by 1930 MPH methane. The efficient machine operates on a 3/1 ratio of air over stoichiometric air and compresses this air to about 12 ATA. The total amount of air compressed is 55143 MPH. Of this air part is fed to the combustor part of the 67 expander (internal or external). The rest of the air, 33840 MPH, is fed to a diffusor unit.

The diffusor unit produced 8990 MPH oxygen-nitrogen mixture, containing 46.8% oxygen. The productivity of the membrane is 2.029 times that of a membrane, working under standard conditions. This comparison is made on basis of diluting products with air down to 34.7 oxygen content and then comparing productivity at this level. It should be pointed out, that under standard conditions, only 40% oxygen content is reached.

If no corrections were made, the mass flow to the expander side of the gas turbine is only 85.04% of that fed to the compressor side. To bring the difference down below 10%, 4375 MPH of steam are added. This steam could be made available from the Claus unit as it is constantly generating steam in its hydrogen sulfide burner. Also, the thrust bearing has to be reversed.

Although the invention has been described with reference to its preferred embodiments those skilled in the art may appreciate from such description various other embodiments and modifications of the invention which do not depart in scope or spirit from the invention as described and claimed hereafter.

What is claimed is:

1. A method for preparing a gas stream containing nitrogen which contains greater than 21 mole % oxygen, and using said gas stream to prepare a normally non-gaseous carbon compound, said method including using a gas turbine comprising an air compression unit and an energy production unit comprising a combustor unit and a first expander unit mechanically linked to the air compression unit by a shaft carrying a thrust bearing, said method comprising the steps of:

(a) compressing air in the air compression unit of the gas turbine;

(b) contacting at least a portion of compressed air from the air compression unit with a means which is preferential for the separation of $O_2$ from pressurized air to produce one gas stream which contains greater than 21 moles % oxygen and which also contains nitrogen and a second gas stream depleted in $O_2$ relative to nitrogen;

(c) passing said oxygen depleted gas stream to the combustor unit of said turbine;

(d) recovering said $O_2$ enriched gas stream in an amount which exceeds the capacity of the thrust bearing;

(e) reacting said $O_2$ enriched gas stream with a source of carbon to produce a gas product stream containing $H_2$, CO and $N_2$;

(f) converting at least a portion of the $H_2$ and CO content of the gas product stream into a normally non-gaseous carbon containing compound;

(g) separating the normally non-gaseous carbon containing compound from the converted gas product stream to yield a residual gas stream containing $N_2$ and oxidizable gaseous compounds; and (h) returning said residual gas stream as fuel to the combustor unit of said turbine thereby returning nitrogen to the energy production unit in a quantity about equal to that amount of nitrogen diverted from the energy production unit in the $O_2$ enriched gas stream.

2. The method of claim 1, wherein said means for preferentially separating $O_2$ from air comprises a semipermeable membrane which is selective to a permeation of oxygen relative to nitrogen to produce in a low pressure permeate zone an oxygen enriched permeate gas stream and in a high pressure non-permeate zone an oxygen depleted non-permeate gas stream.

3. The method of claim 2, further comprising the step of passing a quantity of air through the permeate zone to strip the oxygen enriched permeate therefrom to produce as a resultant stream an $O_2$ enriched gas stream having an $O_2$ content not exceeding about 35 mole % $O_2$.

4. The method of claim 3, wherein said stripping air is provided in a quantity such that the number of moles of $N_2$ thereby added to the $O_2$ enriched gas stream compensates in mass for that quantity of oxygen removed from the $O_2$ enriched gas stream in the form of water and non-gaseous carbon containing compound.

5. The method of claim 1, wherein with respect to step (f) a portion of the $H_2$ and CO content of said gas product stream is converted into a normally liquid carbon containing compound by:

removing water from the gas product stream, and contacting the gas product stream with a catalyst composition which promotes reaction between $H_2$ and CO to produce a quantity of a methoxy compound.

6. The method of claims 5, further comprising the step of contacting said methoxy compound with a molecular sieve catalyst composition to convert the methoxy compound into a normally liquid hydrocarbon compound.

7. The method of claim 1, wherein with respect to step (f) a portion of the $H_2$ and CO content of said gas product stream is converted into a normally liquid hydrocarbon compound by subjecting said gas product stream to a water-gas shift reaction to provide a shifted gas stream wherein the ratio of $H_2$ to CO of from about 1.85 to about 2.2;

removing $CO_2$ from said shifted gas stream;

reacting the shifted gas stream under Fischer-Tropsch reaction conditions to convert a portion of its $H_2$ and CO content to a normally waxy hydrocarbon;

separating the waxy hydrocarbon from the gas stream;

adding $CO_2$ and steam to the gas stream;

reforming the gas stream to increase the $H_2$ content thereof;

returning the waxy hydrocarbon to the gas stream;

reacting the gas stream under Fischer-Tropsch reaction conditions to convert a portion of its $H_2$ and CO content to a normally waxy hydrocarbon;

hydrofining the gas stream to crack the normally waxy hydrocarbon content thereof to a normally liquid hydrocarbon content; and recovering the normally liquid hydrocarbons from said gas stream.

* * * * *